US007568223B2

(12) United States Patent
Sprunk et al.

(10) Patent No.: US 7,568,223 B2
(45) Date of Patent: Jul. 28, 2009

(54) INTERNET PROTOCOL TELEPHONY SECURITY ARCHITECTURE

(75) Inventors: Eric J. Sprunk, Carlsbad, CA (US); Paul Moroney, Olivenhain, CA (US); Alexander Medvinsky, San Diego, CA (US); Steven E. Anderson, La Jolla, CA (US); Jonathan A. Fellows, Del Mar, CA (US)

(73) Assignee: General Instrumental Corporation, Horsham, PA (US)

( * ) Notice: Subject to any disclaimer, the term of this patent is extended or adjusted under 35 U.S.C. 154(b) by 756 days.

(21) Appl. No.: 10/893,047

(22) Filed: Jul. 15, 2004

(65) Prior Publication Data
US 2005/0027985 A1    Feb. 3, 2005

Related U.S. Application Data

(63) Continuation of application No. 09/546,900, filed on Apr. 10, 2000, now abandoned.

(60) Provisional application No. 60/128,772, filed on Apr. 9, 1999.

(51) Int. Cl.
*H04L 9/00* (2006.01)
(52) U.S. Cl. .................... 726/10; 380/266; 380/279
(58) Field of Classification Search ............ 380/279, 380/266; 726/10
See application file for complete search history.

(56) References Cited

U.S. PATENT DOCUMENTS 5,544,322 A * 8/1996 Cheng et al. ............... 709/229
5,602,918 A * 2/1997 Chen et al. ................. 713/153
5,778,065 A * 7/1998 Hauser et al. .............. 713/155
5,796,830 A * 8/1998 Johnson et al. ............ 380/286
5,864,665 A * 1/1999 Tran .......................... 726/10
5,864,667 A * 1/1999 Barkan ....................... 729/10
5,917,817 A   6/1999 Dunn et al.
5,999,612 A   12/1999 Dunn et al.
2003/0163693 A1 * 8/2003 Medvinsky ................. 713/169

FOREIGN PATENT DOCUMENTS

| EP | 0580350 A1 | 1/1994 |
| EP | 0738058 A2 * | 10/1996 |
| WO | WO 98/47298 A2 | 4/1998 |
| WO | WO 0062507 A1 * | 10/2000 |
| WO | WO 0225899 A1 * | 3/2002 |

* cited by examiner

*Primary Examiner*—Kambiz Zand
*Assistant Examiner*—Jacob Lipman
(74) *Attorney, Agent, or Firm*—Larry T. Cullen

(57) ABSTRACT

A secure Internet Protocol (IP) telephony system, apparatus, and methods are disclosed. Communications over an IP telephony system can be secured by securing communications to and from a Cable Telephony Adapter (CTA). The system can include one or more CTAs, network servers, servers configured as signaling controllers, key distribution centers (KDC), and can include gateways that couple the IP telephony system to a Public Switched Telephone Network (PSTN). Each CTA can be configured as secure hardware and can be configured with multiple encryption keys that are used to communicate signaling or bearer channel communications. The KDC can be configured to periodically distribute symmetric encryption keys to secure communications between devices that have been provisioned to operate in the system and signaling controllers. The secure devices, such as the CTA, can communicate with other secure devices by establishing signaling and bearer channels that are encrypted with session specific symmetric keys derived from a symmetric key distributed by a signaling controller.

15 Claims, 14 Drawing Sheets

INTERNET PROTOCOL TELEPHONY SECURITY ARCHITECTURE

CROSS-REFERENCES TO RELATED APPLICATIONS

This application is a continuation of U.S. application Ser. No. 09/546,900 filed Apr. 10, 2000, entitled INTERNET PROTOCOL TELEPHONE SECURITY ARCHITECTURE, which claims the benefit of U.S. Provisional Application 60/128,772, filed Apr. 9, 1999, entitled INTERNET PROTOCOL TELEPHONE SECURITY ARCHITECTURE, each of which is hereby incorporated herein by reference in its entirety.

BACKGROUND OF THE INVENTION

The disclosure relates to Internet Protocol telephony. More particularly, the disclosure relates to security in an Internet Protocol telephony network.

Communication systems, particularly communication networks enabled for public access, are configured to provide remote communications for users connected to the system. System operators may bill system users based in part on a perceived value of the communication services provided by the network or based in part on a level of network resources engaged in supporting a user communication. Some users may attempt to access the communication system in an unauthorized manner in an attempt to receive the benefits of the communication system without the corresponding cost.

The degree of effort an unauthorized user applies to accessing the system is typically proportional to the value associated with access to the system. For example, a highly secure network that provides a low value to an unauthorized user may be relatively immune from attacks by unauthorized users. In contrast, a relatively unsecured network that potentially provides high value to unauthorized users may constantly be targeted by unauthorized users.

A telephone system is an example of a communication system that provides varying level of services. Unauthorized user expend proportionate levels of effort in attempting to access those features of the system that are perceived as providing the highest value. Basic phone service is typically of lower value and is not often the efforts of unauthorized users. However, long distance service provided by the phone system has a much higher value and thus, is the goal of many attacks to the system.

The theft of network services can occur through many means. However, unauthorized system access is gained typically through the use of hardware clones or protocol attacks.

A hardware clone is a device that is configured to be virtually identical to an authorized device within the system. Unauthorized access to system services is gained by masquerading as an authorized user. Communication systems such as wireless telephone systems and satellite television systems were often the targets of unauthorized clone access during the early years of system implementation.

A protocol attack is based on exploiting a weakness in one or more protocols used in the communication system. A simplified example of a protocol attack is in a communication system that provides access based on password authentication. An unauthorized user may use various techniques in an effort to "guess" a correct password allowing access to the system. Alternatively, an unauthorized user may monitor a communication channel or link for the presence of an authorized user and record the communication messages transmitted by the authorized user when accessing the system. The unauthorized user may then retransmit or replay the communication messages from the authorized user to access the system.

Internet Protocol (IP) based networks are subjected to unauthorized intrusions and attacks in attempts to access services and data available on the network. IP telephony networks combine the services of previous IP and telephone networks while still allowing compatibility and access to legacy systems.

Because an IP telephony network can be configured to provide services of both legacy IP networks and Public Switched Telephone Networks (PSTN), the IP telephony network is likely to be the subject of attacks designed to provide unauthorized access. Therefore, it is desirable to have a secure IP telephony network architecture that is resistant to present and future intrusions.

BRIEF SUMMARY OF THE INVENTION

A secure Internet Protocol (IP) telephony system, apparatus, and methods are disclosed. Communications over an IP telephony system can be secured by securing communications to and from a Cable Telephony Adapter (CTA). The system can include one or more CTAs, network servers, servers configured as signaling controllers, key distribution centers (KDC), and can include gateways that couple the IP telephony system to a Public Switched Telephone Network (PSTN). Each CTA can be configured as secure hardware and can be configured with multiple encryption keys that are used to communicate signaling or bearer channel communications. The KDC can be configured to periodically distribute symmetric encryption keys (called session keys) to allow devices that have been provisioned to operate in the system in order to be able to authenticate and to establish secure sessions with servers in an IP Telephony network. The secure devices, such as the CTA, can communicate with other secure devices by establishing signaling and bearer channels that are encrypted with session specific symmetric keys derived from the distributed symmetric key.

The disclosure includes secure IP telephony system including a Cable Modem Termination System (CMTS) configured to provide a communication interface between at least one Cable Telephony Adapters (CTA) and an IP telephony network, a signaling controller within the IP telephony network coupled to the CMTS and configured to generate a symmetric sub-key in response to a request from the at least one CTA, the request including a signaling controller ticket, the signaling controller further configured to distribute the symmetric sub-key to the at least one CTA in response to the signaling controller ticket, and a Key Distribution Center (KDC) within the IP telephony network and coupled to the signaling controller, and configured to generate and distribute the signaling controller ticket and a signaling controller session key to the at least one CTA using public key encryption.

The disclosure also includes a secure IP telephony system including a CTA coupled to an IP telephony network and comprising a public key and a corresponding private key of the same key pair and a public key certificate signed by a certificate authority, a KDC coupled to the IP telephony network and configured to generate a ticket to the CTA in response to a request from the CTA and distribute the ticket and corresponding session key to the CTA using public key encryption, and a signaling controller coupled to the IP telephony network and configured to receive the ticket and encrypted session key in a call set up request from the CTA and generate and distribute a symmetric sub-key to the CTA in response to the call set up request.

The disclosure further includes a method of securing communications in an IP telephony system, including receiving a session key, establishing a secure signaling session with a signaling controller, in part, using the session key, receiving a call-specific sub-key from the signaling controller, and establishing secure communications with a destination device using at least one symmetric key derived from the sub-key.

The disclosure further includes a method of securing communications in an IP telephony system, including receiving a ticket from a CTA, transmitting a signaling sub-key to the CTA, establishing secure signaling with the CTA based in part on the signaling sub-key, receiving from the CTA a request for a call set up with a destination device, generating a call specific sub-key, transmitting the call specific sub-key to the destination device, and transmitting the call specific sub-key to the CTA.

BRIEF DESCRIPTION OF THE DRAWINGS

The features, objects, and advantages of embodiments of the disclosure will become more apparent from the detailed description set forth below when taken in conjunction with the drawings, in which like elements bear like reference numerals.

DETAILED DESCRIPTION OF THE INVENTION

A secure network architecture for IP telephony is disclosed. The secure IP telephony architecture can be implemented in a secure IP telephony system, apparatus for use in a secure system, and methods embodied within the secure system. The secure IP telephony system is disclosed in relation to an IP telephony system implemented in a Hybrid Fiber Coax (HFC) system. However, the secure system is not limited to an HFC system and other system implementations are possible.

The secure system includes a number of encryption keys that are distributed between the various network elements in the secure IP telephony system. The encryption keys are used to ensure the security of signaling messages as well as the security of the bearer channel messages.

A Key Distribution Center (KDC) distributes symmetric encryption keys to the network elements using authenticated public key encryption. The use of public key encryption with authentication allows for nearly limitless scaling of the number of network elements without the associated security issues relating to the distribution and security issues surrounding manufacturing network elements having secure symmetric keys.

The KDC can distribute the symmetric keys by establishing a secure session with each network element. The identity of the network element can be authenticated by the KDC. The network element can be, for example, a Cable Telephony Adapter (CTA). The KDC can periodically update the symmetric keys to limit the effects of any compromise of a symmetric key.

A CTA can initiate a telephone call by securely exchanging signaling messages with its signaling controller using a shared symmetric key that it established earlier with the signaling controller, during a key management exchanged that was based on the CTA's signaling controller ticket and session key. Signaling controller generates a symmetric key specific for the call and distributes it to both the initiating and destination CTAs. Both the source CTA and the destination device use the call specific symmetric key to generate additional symmetric keys that are used for communication of bearer channel traffic.

The use of periodically updated symmetric keys that are used by the network elements to securely exchange call specific symmetric keys enables nearly all communications within the IP telephony system to be encrypted. The transient nature of the encryption keys helps to minimize unauthorized access through offline cryptanalysis.

Figure 1:
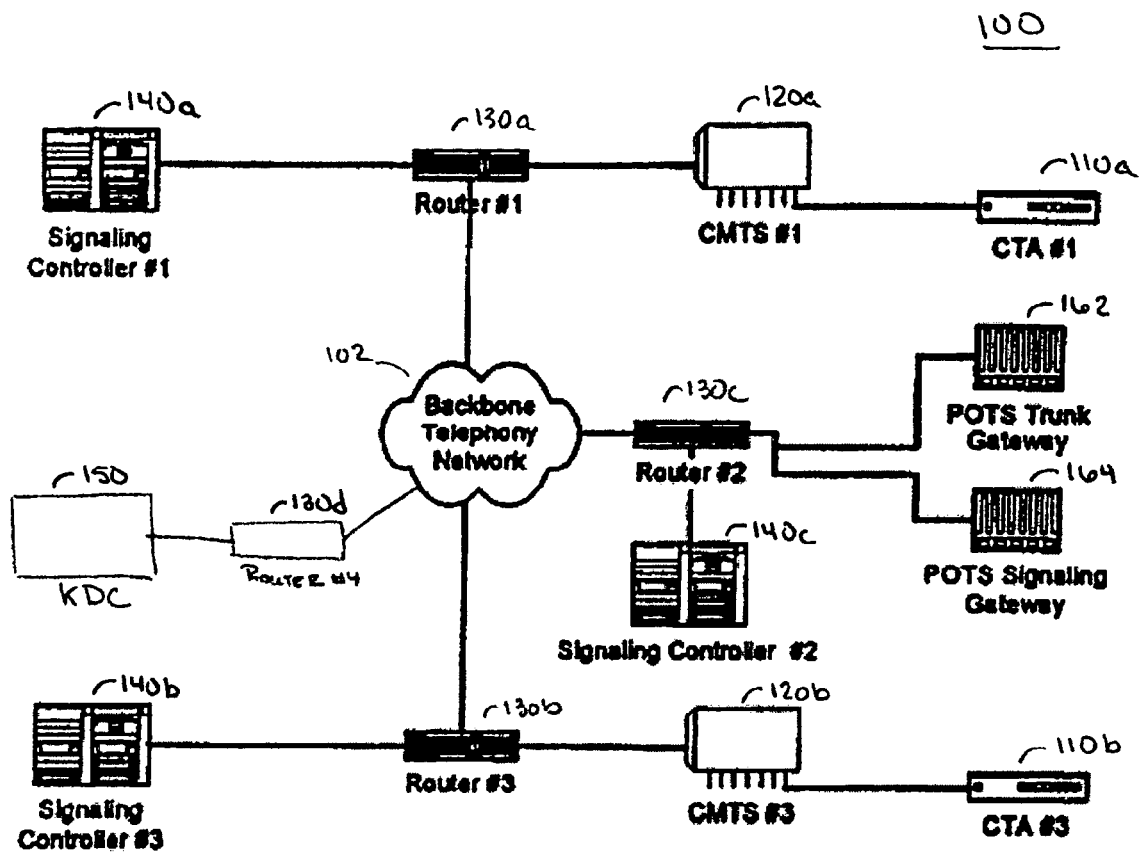
FIG. 1 is a functional block diagram of a secure IP telephony system.

FIG. 1 is a functional block diagram of an embodiment of a secure IP telephony system 100. The secure IP telephony system 100 can be, for example, a Hybrid Fiber Coax (HFC) IP telephony system implementing the Data Over Cable Service Interface Specification (DOCSIS) standard. The secure IP telephony system 100 may also use a communication protocol such as the Real-Time Protocol (RTP) for telephony bearer channel traffic.

The secure IP telephony system 100 embodiment shown in FIG. 1 includes a network 102 interconnecting a plurality of Cable Telephony Adapters (CTAs) 110a and 110b. Each CTA 110a and 110b is coupled to a corresponding Cable Modem Termination System (CMTS) 120a and 120b. A CMTS 120a or 120b is a component that exchanges digital signals with the CTAs 110a and 110b on connected to the network 102. A CMTS 120a and 120b can be located at a local office of an IP telephony provider.

Multiple routers 130a-130d can be configured to interface the particular elements on a branch of the network 102 with the other branches of the network 102. A first router 130a is configured to interface with the first CMTS 120a and a first signaling controller 140a. The first signaling controller 140a is configured to interface with the first CTA 110a via the first CMTS 120a. The first signaling controller 140a can be configured to perform signaling related to, for example, call set up and tear down of calls over the network 102.

A second signaling controller 140b is similarly coupled to a second router 130b on another branch of the network 102. The second router 130b is also coupled to a second CMTS 120b and an associated second CTA 110b.

A third router 130c is configured as part of a network 102 branch that interfaces with external networks, such as an external Public Switched Telephone Network (PSTN) providing plain old telephone service (POTS). The third router 130c is coupled to a third signaling controller 140c. The third router 130c is also coupled to a POTS trunk gateway 162 and a POTS signaling gateway 164 that are configured to provide the interface for bearer traffic and signaling data, respectively.

A fourth router 130d on a fourth network 102 branch is coupled to a Key Distribution Center (KDC) 150. The KDC 150 is configured to deliver symmetric encryption keys to the various CTAs 110a and 110b. The KDC 150 in the embodiment of FIG. 1 is shown as a distinct element. In other embodiments, the KDC 150 can be co-located with a signaling controller, such as the first signaling controller 140a. The KDC 150 and first signaling controller 140a can be, for example, implemented within the same piece of hardware, such as a server.

The communications across the various elements in the network 102 can be secured using encryption. The various signaling and bearer traffic messages communicated between devices can be encrypted, authenticated, or a combination of encrypted and authenticated. The security is based on Kerberos™ where a KDC 150 distributes tickets and session keys to the CTAs 110a and 110b, so that they can use those tickets and session keys to establish secure signaling channels with the signaling controllers 140a-140c, and then use those secure signaling channels to establish secure connections with other IP Telephony network entities such as the gateways 162 and 164 or other CTAs. The KDC 150 can utilize public key encryption to distribute session keys to CTAs.

In one embodiment, the KDC 150 and CTAs 110a and 110b use a Kerberos protocol with a Public Key Cryptography for Initial Authentication in Kerberos (PKINIT) extension for key management. This protocol is based on Kerberos tickets, which are similar to HTTP cookies, encrypted with the particular server's key. A Kerberos ticket is used to both authenticate a client, such as the first CTA 110a, to a server, such as the first signaling controller 140a, and to establish a shared session key contained in the ticket.

A Kerberos ticket contains a session key, identities of the client, such as CTA 110a, and the server first signaling controller 140a, and an expiration time. All of that information is encrypted using a secret key of the server, the first signaling controller 140a. Only the desired server, here the first signaling controller 140a, is able to decrypt the ticket and use that information.

The same session key that is inside the ticket is also delivered by the KDC 150 to the client, the first CTA 110a, sealed with the client's public key or with a secret derived from a Diffie-Hellman exchange. The first CTA 110a can hand the session ticket to the first signaling controller 140a to establish a session in which they share a symmetric session key.

The same signaling controller Ticket and session key can be reused for many phone calls over a configurable period of time on the order of days or weeks. The expiration time inside the ticket will prevent a CTA 110a from using the ticket after it has expired. Once the ticket has expired, the CTA 110a will need to perform another PKINIT exchange with the KDC 150.

The Kerberos Generic Security Services Application Programming Interface (GSS-API) standard can be used to access Kerberos services. The KDC 150 and CTAs 110a and 110b can use an extension of the GSS-API having an API for the PKINIT public key authentication.

The CTA, for example 110a, can use two-way authentication with public key certificates to obtain a signaling controller Ticket from the KDC 150. The KDC 150 delivers the corresponding session key to the CTA 110a sealed with a CTA 110a RSA public key or with a secret derived from a Diffie-Hellman exchange.

The signaling controller ticket is kept for a relatively long period of time, on the order of days or weeks. However, the length of this period can be adjusted, based on the performance requirements. A more secure system may implement shorter durations for each signaling controller ticket. The signaling controller ticket is used to establish a symmetric session key, which is in turn used to establish a set of keys for use with the IPsec ESP mode. The keys used by IPsec may be limited to just a single telephone call or may be used for more than one telephone call. The IPsec keys are not derived from the session key itself. Rather, another random key, a sub-key, is generated for each phone call and then used to derive the IPsec keys.

The advantage of the first signaling controller 140a generating IPsec keys only for the duration of the phone call, is that the signaling controller then does not have to maintain a state. After it derives all the required keys from the sub-key and exchanges signaling messages with the CTA 110a, it can throw away the ticket along with all of the associated keys.

The first CTA 110a presents to the first signaling controller 140a a session ticket along with some data encrypted with the session key that authenticates the CTA 110a in order to establish an IPsec ESP session. In a response, the first signaling controller 140a returns a randomly generated sub-key, encrypted with the session key. The first CTA 110a uses the sub-key to derive a set of required IPsec keys. The IPsec keys can include two Hash-based Message Authentication Code (HMAC) authentication keys and two triple Data Encryption Standard (3-DES) encryption keys. These IPsec keys are valid for only one telephone call.

For each call, the source signaling controller, here the first signaling controller 140a, also randomly generates a sub-key for the CTA-to-CTA signaling and bearer channel communication and distributes it to the two CTAs, for example 110a and 110b. This key distribution is communicated outside of Kerberos and is done over already established IPsec ESP sessions between each CTA, for example 110a, and its signaling controller, for example 140a. Both CTAs 110a and 110b engaged in a call derive a set of IPsec ESP keys for the CTA-to-CTA signaling messages and another set of keys for encrypting the RTP bearer channel packets.

Figure 2A:
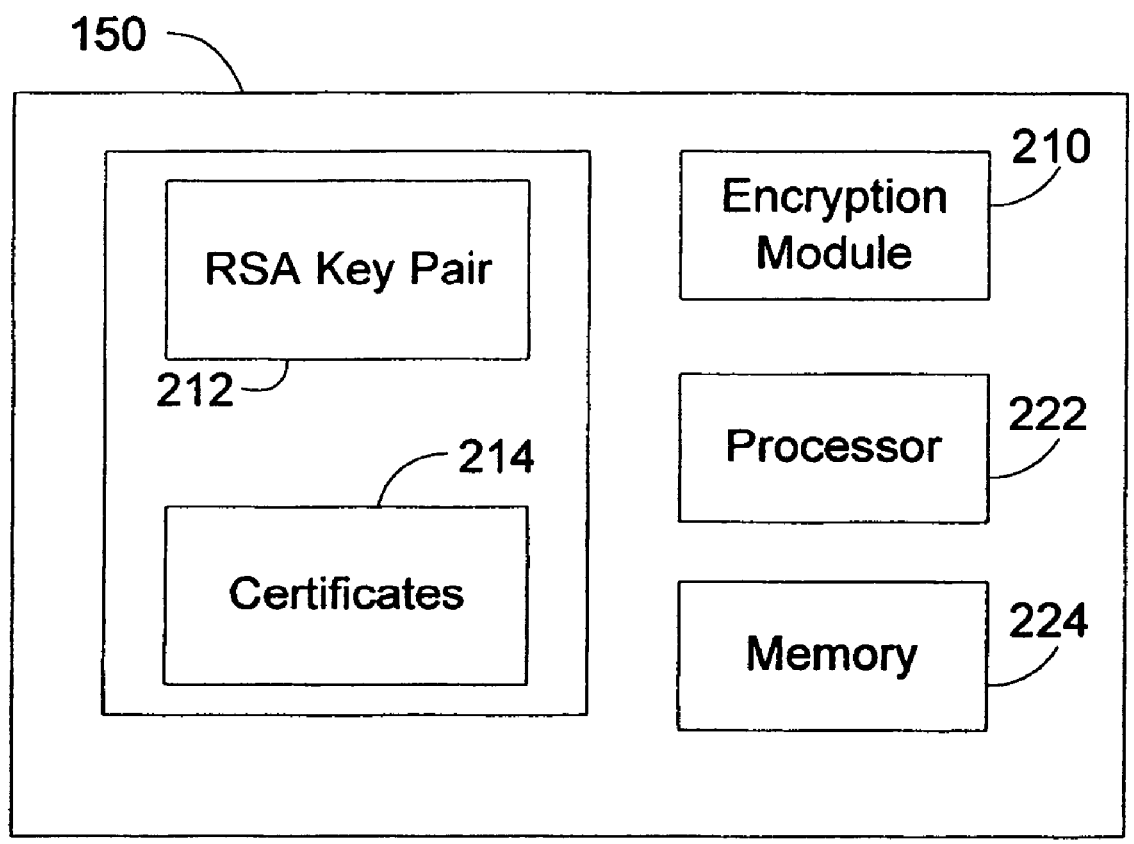
FIGS. 2A-2C are functional block diagrams of embodiments of elements of the secure IP telephony system.

FIG. 2A is a functional block diagram of an embodiment of a KDC 150, such as the KDC 150 shown in the secure IP telephony system 100 of FIG. 1. The KDC 150 includes registers, memory, or modules configured to store and process data associated with the encryption protocols and key management of the secure IP telephony system. A signaling controller, such as those shown in FIG. 1, can have a configuration that is similar to the configuration of the KDC 150. The KDC 150 and signaling controller can share some or all of the modules when the two are implemented within the same hardware.

The KDC 150 includes a key module 212 configured to store one or more secure keys. In the embodiment shown in FIG. 2A, the KDC includes a key module 212 configured to store an RSA key pair, which can include a public key and a corresponding private key. The keys can be constructed to be of a length sufficient to provide a level of security desired in the system. The keys can be, for example, RSA keys that may be 2048 bits in length.

The KDC 150 can also include a certificate module 214 configured to store one or more certificates issued and signed by one or more certificate authorities. The certificate module 214 can store, for example, a certificate that complies with X.509 Public Key Infrastructure (PKI) policies and practices. The certificate authority issuing and signing both device and KDC certificates can include, for example, a manufacturer or a network operator. This certificate module may store KDC's own certificate and a certificate of a CA that issued this KDC certificate. The certificate module may also store trusted CA certificates that can be used to validate CTA certificates, as they are received in the PKINIT request messages.

The KDC 150 also includes an encryption module 210 that can be configured to encrypt and decrypt messages using the keys stored in the key module 212. The encryption module 210 can also include a certificate from the certificate module 214 in order to allow transmitted messages to be authenticated by the destination device. The encryption module 210 can operate in conjunction with a processor 222 and memory 224.

The various modules within the KDC 150 can be part of a secure processor that is configured to provide physical security for the various keys, certificates, and processes performed by the KDC 150. The secure processor may be configured such that no secret cryptographic keys exist as clear text outside of the secure processor. The secure processor can provide a level of security that is at least at Federal Information Processing Standard (FIPS) 140-1 level 3.

Figure 2B:
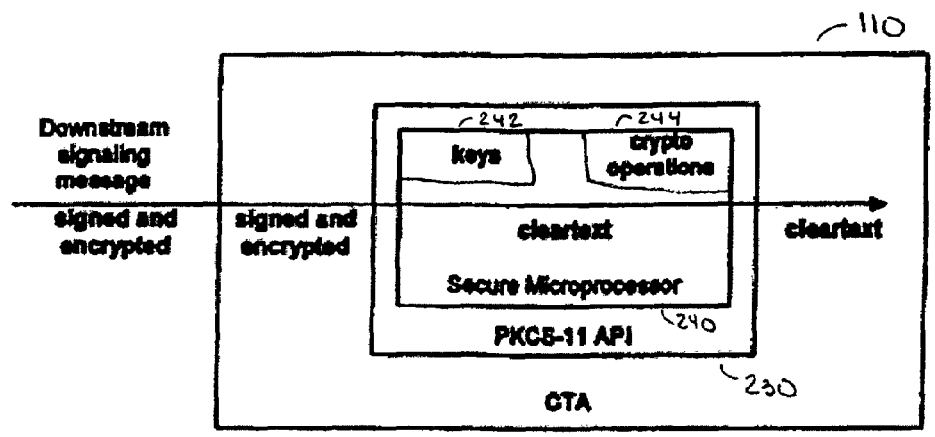
Figure 2C:
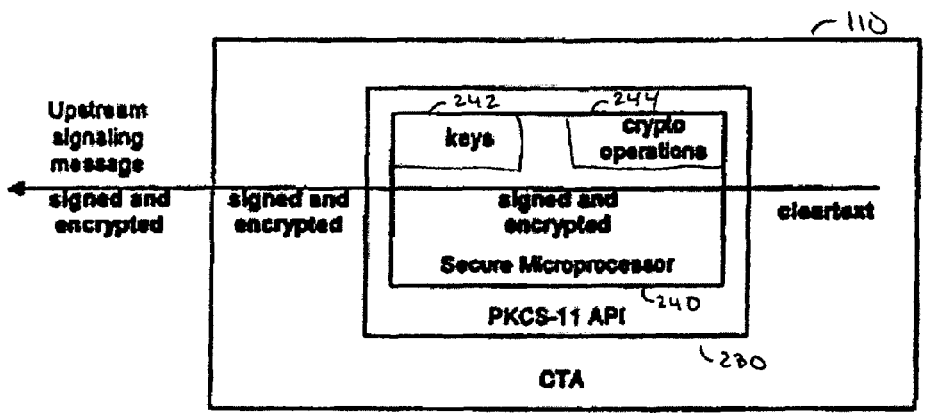

FIG. 2B is a functional block diagram of an embodiment of a CTA 110 that can be, for example, one of the CTAs 110a and 110b of the secure IP telephony system 100 of FIG. 1. The functional block diagram of FIG. 2B shows the signal flow for the condition where the CTA 110 is configured to receive encrypted messages and decrypt them to clear text, while FIG. 2C shows the signal flow for the condition where the CTA 110 receives clear text and generates encrypted messages.

The CTA 110 includes secure cryptography module 230 that may be configured to operate as a Cryptoki Application Programming Interface (API) in accordance with the PKCS-11 standard. The secure cryptography module 230 includes a secure microprocessor 240 operating in conjunction with a key module 242 and a cryptographic operation module 244. The key module 242 stores the RSA key pair used to communicate with the KDC during distribution of the symmetric keys and can be used to store the various symmetric keys that are received from the KDC and generated from the symmetric key distributed by the KDC. The key module 242 can store the RSA key pairs and the signed certificates in accordance with X.509.

The secure microprocessor 240 provides physical protection in the form of tamperproof hardware for the RSA private key that is used as proof of the CTA's identity. The secure microprocessor 240 complies with the FIPS 140-1 standard level 3, whenever sections of that standard are applicable. A private key is typically not updated without a secure transaction involving very strong cryptography.

A public root verification key is also stored in the key module 242 and is needed for the CTA 110 to validate KDC certificates. While this information is public, it conveys the identity of the KDC to the CTA 110, and is typically not updated without a secure transaction involving very strong cryptography. This is required to avoid the holder of a leased CTA 110 using it in a new network, without permission from the CTA owner, which may be for example a telephone company or other network operator. Thus, the root verification key is also stored inside the key module 242 of the secure microprocessor 240.

Access to this secure microprocessor 240 may be provided with a CryptoKi API, based on the PKCS-11 standard. The CTA 110 typically does not contain any debug or maintenance modes that bypass normal security procedures and allow extraction or updates to secret keys in a raw, unencrypted form.

As shown in FIG. 2B, the CTA 110 receives downstream signaling messages that can be signed, encrypted, or a combination of signed and encrypted. The encrypted messages access the secure microprocessor 240 via the PKCS-11 API of the secure cryptography module 230. The secure microprocessor 240 operates on the secure messages using the cryptographic operation module 244 in conjunction with the keys stored in the key module 242 to decrypt the messages. The result is the clear text of the encrypted messages.

As shown in FIG. 2C, the CTA 110 performs the complementary process by receiving clear text messages. The secure cryptography module 230, using the secure processor 240, encrypts the messages in the cryptographic operation module 244 using one or more of the keys stored in the key module 242. The CTA 110 provides the signed and encrypted upstream signaling message to a destination device connected to the network.

Figure 3:
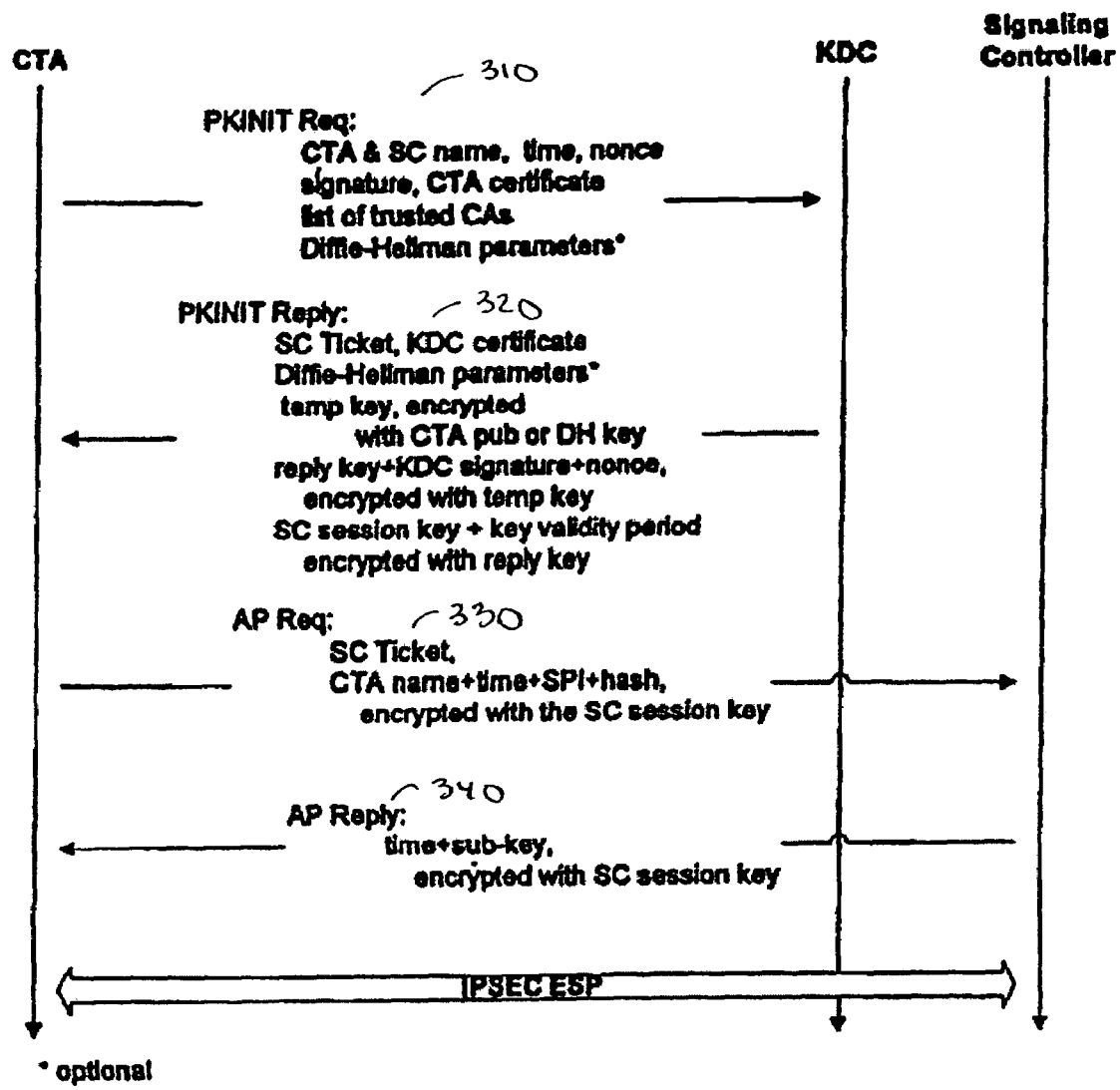
FIG. 3 is a flow diagram of an embodiment of symmetric key distribution using public key encryption.

FIG. 3 is a flow diagram of an embodiment of symmetric key distribution using public key encryption. The process of the flow diagram can be performed by the corresponding network elements of the secure IP telephony system of FIG. 1. The flow diagram shows how the Kerberos ticket, and thus a symmetric key, is distributed to a CTA. However, the key distribution may also be performed between the KDC and a network device, such as a gateway.

The flow diagram of FIG. 3 shows a PKINIT exchange that is performed at relatively long intervals. The process allows the KDC to distribute an intermediate symmetric session key. This session key is shared between the CTA and the signaling controller via the signaling controller ticket distributed by the KDC.

The signal flow begins with a CTA requesting a Kerberos ticket from the KDC using a PKINIT Request message 310. The request can include the name of the CTA and associated signaling controller, a time stamp, a nonce, signature, a CTA certificate, a list of trusted Certificate Authorities (CA), and optionally, Diffie-Hellman public key and associated parameters. The CTA certificate can be a certificate issued by a manufacturer or a certificate issued by the network operator. The certificate issued by the network operator can include a phone ID derived in part from the telephone number associated with the CTA. The certificate issued by the network operator can thus be limited to PKINIT exchanges within the domain controlled by the network operator.

In response, the KDC generates a PKINIT Reply message 320 directed to the CTA. The CTA receives the PKINIT Reply message 320 from the KDC having the requested signaling controller ticket. The PKINIT Reply message 320 includes the signaling controller ticket, a KDC certificate, Diffie-Hellman parameters, a PKINIT temp key. Alternatively, the PKINIT reply can be restructured so that the session key can be encrypted directly with the CTA public key or a key derived from a Diffie-Hellman exchange. The KDC can encrypt the signaling controller ticket, KDC certificate, Diffie-Hellman parameters and PKINIT temp key with a CTA public key or with a Diffie-Hellman key. The PKINIT Reply message 320 can also include a reply key, KDC signature, and nonce encrypted with the PKINIT temp key. The PKINIT Reply message 320 can also include a signaling controller session key and a key validity period encrypted with the reply key.

The PKINIT Request and Reply messages will be sent over a Transport Control Protocol/Internet Protocol (TCP/IP) connection. A single PKINIT Request or Reply message, containing a public key and Diffie-Hellman information is typically too large to fit into a single unfragmented User Datagram Protocol (UDP) packet. Off the shelf KDCs must support UDP, but normally require a TCP connection for messages that do not fit into one UDP packet. The use of TCP instead of UDP may have some impact on performance, but since the PKINIT exchange occurs at infrequent intervals, often days or weeks apart, and is not tied to the phone calls, this does not appear to be a problem. Alternatively, UDP with IP fragmentation can be used to send larger packets.

The signaling controller session key is used in the Kerberos Application (AP) Request 330 and AP Reply 340 messages that are exchanged to establish a symmetric sub-key for each phone call. This sub-key is used to derive all of the IPsec ESP keys and starting sequence numbers used in both directions. The AP Request and AP Reply messages are small enough to fit into a single UDP packet, and thus will run over UDP.

The CTA sends the Kerberos AP request 330 to the signaling controller to establish a session with the signaling controller. The AP request can include the signaling controller ticket received from the KDC, the CTA name, a timestamp, a Security Parameters Index (SPI) used to identify a security association for IPsec communications, and a hash. The message parameters are encrypted with the signaling controller session key corresponding to the specific signaling controller.

The SPI shown in the AP Request 330 is for the upstream CTA-to-SC messages. SPI+1 is the IPsec SPI for the corresponding downstream messages. Kerberos defines an application-specific Authorization Data field in the AP Request message 330. This field is used to carry the SPI.

The signaling controller is able to decrypt the ticket inside the AP request 330 message encrypted with its server key and is able to recover the signaling controller session key and other parameters contained in the ticket. In response to the AP request 330, the signaling controller generates an AP reply 340.

The CTA receives the AP reply 340 containing a time stamp and a randomly generated sub-key. The message parameters are encrypted with the signaling controller session key. The CTA can then establish an IPsec ESP session with the signaling controller IPsec protocol in the ESP mode is used to secure all signaling messages between the CTA and the signaling controller. The IPsec ESP protocol includes authentication, privacy and replay prevention. IPsec ESP runs between the IP and transport protocol layers running TCP or UDP. IPsec provides Hash-based Message Authentication Code (HMAC) authentication of the IP packet payloads. IPsec provides packet encryption, for which 3-key 3-DES in the Cypher Block Chaining (CBC) mode may be used. Since IPsec runs at a low layer, where a sequence of packets is not guaranteed, an Initialization Vector (IV) is attached explicitly to each packet. This creates an 8-byte overhead for each IP packet. Another embodiment allows the IV to be derived implicitly from a packet sequence number and SPI.

In order to strengthen message authentication, each IPsec packet should be decrypted and authenticated by a secure microprocessor in one operation as shown in the CTA embodiments of FIGS. 2B and 2C. The secure processor implementation limits a hacker's ability to bypass message authentication by hacking the CTA software. If the CTA software is hacked to avoid the passage of an IP packet through a secure microprocessor, that packet is not decrypted and will be useless.

After setting up a session with a signaling controller, a CTA can establish a call with another CTA coupled to the network, a network server capable of communicating bearer channel traffic, or an off network device via a gateway server. The signaling controller associated with this CTA distributes keys and sets up each of these communication links in a similar fashion.

Figure 4:
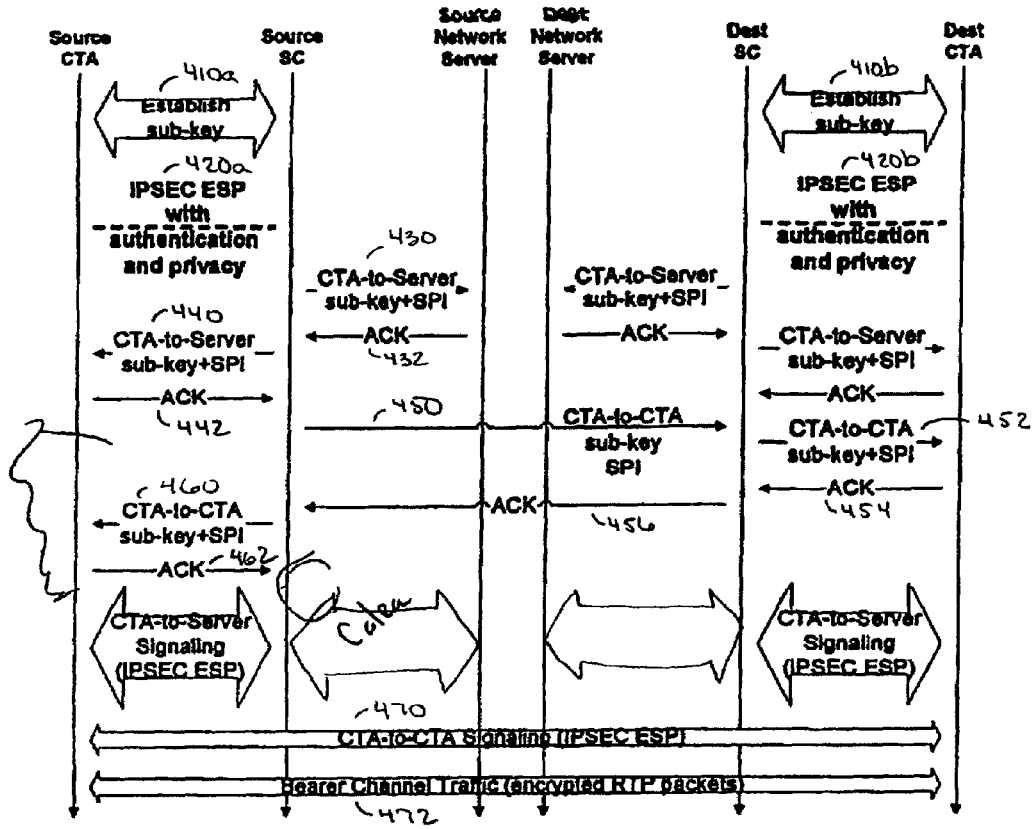
FIG. 4 is a flow diagram of an embodiment of key distribution during set up of communications.

FIG. 4 is a flow diagram of an embodiment of key distribution during set up of communications between two CTAs, such as the first and second CTAs of FIG. 1. The flow diagram of FIG. 4 assumes that each CTA has previously established an IPsec ESP session with the corresponding signaling controller, such as by the process shown in FIG. 3. The flow diagram of FIG. 4 also shows communications with intermediate network servers. Depending on the position of the CTAs within a network, the communications may or may not traverse the network servers.

As shown in the flow diagram of FIG. 4, a source CTA initializes the call through a source signaling controller. An end to end sub-key is communicated between the source and destination signaling controllers and the source and destination CTAs can set up the signaling and bearer traffic channel using symmetric keys generated from the end to end sub-key. Here, the end to end sub-key is used by the source and destination CTAs.

During each phone call, the source and destination CTAs exchange secure signaling and bearer channel messages. At the start of each phone call a source signaling controller generates a random CTA-to-CTA (end to end) sub-key and distributes it to both CTAs. The sub-key is distributed over IPsec ESP sessions previously established between each CTA and its respective signaling controller. Both CTAs then derive from the sub-key a set of IPsec ESP keys for signaling and RTP encryption keys for media packets.

Similarly, for the CTA-to-Other Network Server communication, the signaling controller generates a CTA-to-Server sub-key and distributes it to the CTA and the server. Both the CTA and the server derive a set of IPsec ESP keys from the end to end sub-key. Here, the end to end sub-key is used by the CTA and the server.

The CTAs are presumed to already have established a sub-key with the signaling controller 410a and 410b and set up a IPsec ESP session 420a and 420b with their respective signaling controllers.

The CTA can communicate to the signaling controller over the IPsec ESP session a desire to set up communications with a corresponding network server. To set up communications between a CTA and a corresponding network server, a set of IPsec ESP keys are established between the CTA and the corresponding server. The signaling controller associated with the CTA generates a new CTA-to-Server sub-key and delivers it to both the CTA and the corresponding network server. The signaling controller generates the sub-key and SPI and delivers it to the network server 430. The network server, in response, generates an ACK. The signaling controller receives the ACK from the network server 432. The ACK can include a hash of the received sub-key and SPI.

The signaling controller can also distribute to the initiating CTA the same sub-key delivered to the network server 440. The signaling controller receives an ACK from the initiating CTA 442 that can include a hash of the received sub-key and SPI.

From this sub-key, the server and the CTA derive IPsec ESP keys and other parameters. The derived set of IPsec ESP parameters for example may include two 160-bit SHA-1 HMAC keys, two 168-bit 3-key 3-DES keys, and two IPsec starting sequence numbers (SN), one for each direction.

The SN delivered along with the sub-key is associated with the CTA-to-Server (upstream) keys. SPI+1 is associated with the Server-to-CTA (downstream) keys.

After the CTA receives its CTA-to-Server sub-key and derives IPsec ESP keys from it, it is ready to communicate with that Network Server. Although the diagram shows that the CTA-to-Server signaling comes after all of the keys had been established, the IPsec ESP signaling can occur once the keys are derived by both the server and the associated CTA.

Similarly, for CTA to CTA communications, the source signaling controller generates a CTA-to-CTA sub-key and delivers it to the destination CTA via the destination signaling controller, and then to the source CTA. In response to a request from the source CTA to initiate communications with the destination CTA, the source signaling controller generates the CTA-to-CTA sub-key including the sub-key and SPI and delivers it to the destination signaling controller 450. The destination signaling controller forwards the message to the destination CTA 452.

The destination CTA generates an ACK addressed to the source signaling controller and delivers the ACK to the destination signaling controller 454. The destination signaling controller sends the ACK to the source signaling controller 456. The ACK can include, as was the case with the other ACK messages, a hash of the received sub-key and SPI.

The source signaling controller can also send to the source CTA the same sub-key and SPI 460 that was sent to the destination CTA. The source CTA responds by sending an ACK 462 having a hash of the sub-key and SPI.

From this sub-key, both CTAs derive a set of symmetric keys including IPsec ESP keys and parameters and RTP packet encryption keys. The derived IPsec ESP keys and other parameters may for example include two 160-bit SHA-1 HMAC keys, two 168-bit 3-key 3-DES keys, and two IPsec starting sequence numbers, one for each direction. The RTP packet encryption keys may include two 168-bit 3-key 3-DES keys and optionally RTP packet authentication keys.

The SPI delivered along with the sub-key is associated with the source CTA-to destination CTA keys. SPI+1 is associated with the destination CTA-to-source CTA (downstream) keys.

After the symmetric keys are delivered to the source and destination CTAs and the CTAs have derived the necessary symmetric keys, the source CTA and destination CTA can engage in secure communications. The source CTA can communicate signaling messages with the destination CTA via an IPsec ESP link 470. The source CTA can communicate bearer channel traffic with the destination CTA via encrypted RTP packets.

In other embodiments, the source CTA calls a regular phone in a PSTN, via a POTS Signaling Gateway. In that embodiment, the key distribution is almost identical, except that the destination CTA is replaced with the POTS Signaling Gateway.

Similarly, it is possible for a regular phone in a PSTN to call up a CTA, via a POTS Signaling Gateway. Again, the scenario is almost identical, except that the source CTA is replaced with the POTS Signaling Gateway.

The system ensures bearer channel privacy by implementing encryption of the RTP packets, including the header. This option is provided for in the standard RTP confidentiality option. The RTP headers can specify if encryption is enabled. However the RTP specification does not specify which key is used for encryption and how the keys are managed.

As discussed in the signal flow diagram of FIG. 4, each CTA may derive two 168 bit 3-DES keys from the CTA-to-CTA sub-key for the RTP layer encryption. A separate encryption key is used for upstream and downstream media packets. The IV (Initialization Vector) for the encryption of the cleartext block of an RTP packet can be set to 0, as defined in the RTP specification. This provides adequate security because the 64 bits of an RTP packet contain 48 bits of random information (16-bit sequence number initialized with a random value and a 32-bit timestamp). The encryption of the remainder of an RTP packet uses a standard Cipher Block Chaining (CBC) mechanism, where the previous ciphertext block is XOR-ed with the next cleartext block, before it is encrypted.

In the case that packet authentication is also desired, it is possible to derive additional MAC keys from the same CTA-to-CTA session keys, and attach a MAC to each packet, before it is encrypted. However, adding a MAC to each media packet adds significant overhead to the bearer channel traffic, particularly in bandwidth.

As shown in the signal flow diagram of FIG. 4, the source signaling controller distributes the 3-DES keys used for the bearer channel privacy, and thus has access to these keys in the clear. The signaling controller can save the keys for the duration of the call in order to satisfy Communications Assistance for Law Enforcement Act (CALEA) requirements.

The bearer channel key can be stored for later retrieval at the signaling controller or at any other network side element involved in the call. If the signaling controller stores the key at a remote network element location, the keys can be stored as an encrypted cookie, as in standard browser technology, because the remote network element has no need to know the bearer channel key in the clear.

End-to-end key negotiation or exchange that does not involve network servers would not have met CALEA requirements, where all encryption keys for the bearer channel must be made available to law enforcement from a reliable source.

To limit the ability of generic hardware to access the secure communication system, the elements in the secure IP telephony system need to be provisioned in a manner that allows access to the secure system.

For example, various keys and certificates are provisioned to each CTA. The keys include an RSA key pair that is used by the CTA in the PKINIT exchange. This key pair is installed at the factory. The CTA also includes an X.509 certificate issued by the network operator during the provisioning phase for the CTA RSA key pair. This certificate is good only for that one network operator.

During the PKINIT exchanges, the CTA will send out just its X.509 certificate signed by the network operator. There is no need to send a longer certificate chain, since the KDC should have the network operator's certificate. In order to improve the performance of the PKINIT exchanges, the KDC can cache a hash of each certificate, referred to as a certificate thumbprint, that was received from the CTA and successfully verified. The next time a certificate with the same hash is encountered, the verification can be omitted.

The CTA also includes an X.509 certificate issued at the factory and signed by the manufacturer. This certificate is configured to be valid for the lifetime of the CTA and is used to authenticate the CTA during the provisioning phase. The CTA also includes a manufacturer certificate, such as a manufacturer certificate issued by a root CA. This certificate is installed at the factory. Alternatively, if the CTA software is downloaded on-line, this manufacturer certificate can be embedded inside the CTA software. The certificate should be valid for at least the expected lifetime of the CTA.

Figure 5A:
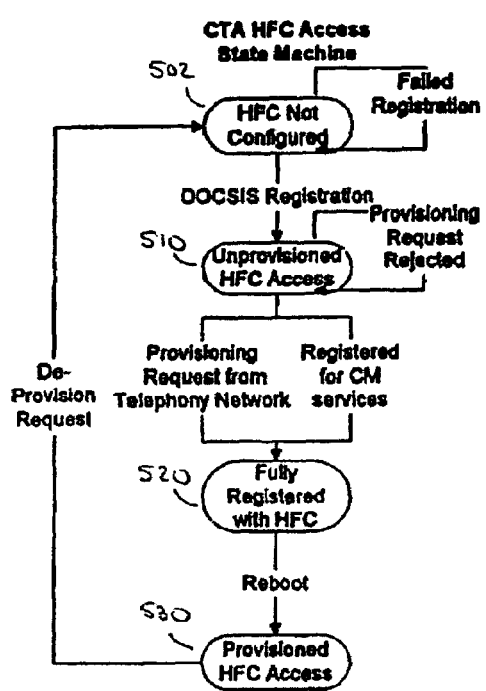
FIGS. 5A-5B are state diagrams of an embodiment of secure CTA provisioning.
Figure 5B:
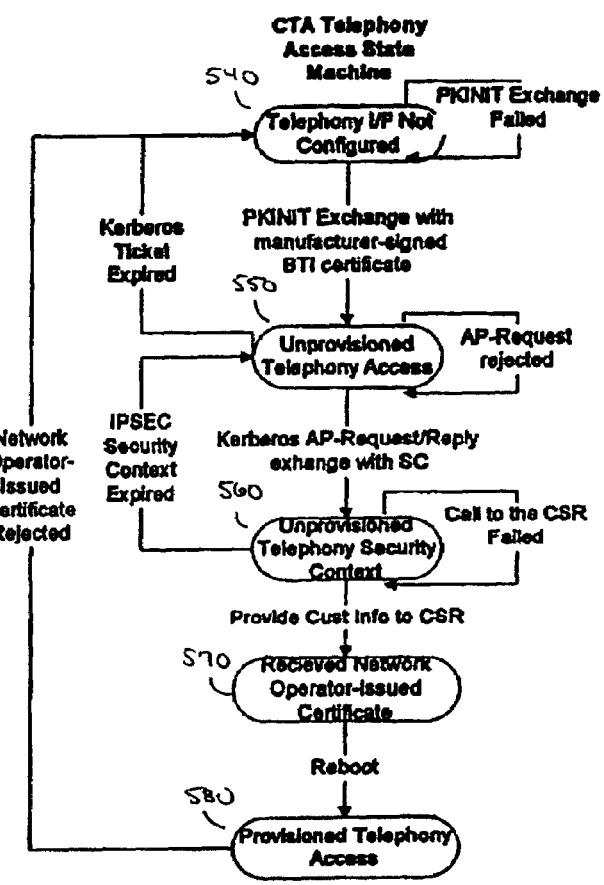

FIGS. 5A-5B are state diagrams of embodiments of secure CTA provisioning. FIG. 5A is a state diagram of an embodiment of CTA HFC access. The state machine can be implemented within a CTA, such as a CTA in the secure IP telephony system of FIG. 1.

The states in the CTA HFC Access State Machine of FIG. 5A include a HFC Not Configured state 502. In this state, the CTA is not provisioned and has not yet tried to register with the HFC Head-End. The CTA remains in this state if an attempt to register with the HFC fails. The CTA is able to move to another state through successful registration, such as through DOCSIS registration.

The CTA can progress to an Unprovisioned HFC Access state 510. While in this state, the CTA is registered with the HFC Head-End, but there is no customer account set up. The HFC system can allow the CTA to register so that it can get access to the Customer Service Representative (CSR). The CTA in conjunction with a CSR provisions the CTA in both the telephony and HFC networks. The CTA remains in this state if a provisioning request is rejected. The CTA may progress to the next state by successfully setting up the CTA customer account.

In the Fully Registered with HFC state 520, the CTA is allowed to send packets anywhere within the telephony network. In order to get to this state, the CTA customer account was set up in the telephony network. The Provisioning CA in the telephony network has notified the HFC Head-End that CTA access to the telephony network should be fully enabled.

Alternatively, the CTA is integrated with the general purpose Cable Modem access. The Cable Modem has been registered for HFC access to some non-telephony network services such as Internet access.

The CTA can progress to the Provisioned HFC Access state 530. The CTA that was fully registered with HFC can progress to this state following a reboot. In the state, the CTA is given full access to the telephony network or some other network services. The CTA can be removed from this state and return to the HFC not configured state 502 if the CTA or the network requests de-provisioning of the CTA.

Once the CTA is provisioned for HFC access, the CTA can be provisioned for telephony access. FIG. 5B is a state machine for CTA telephony access. The states in the CTA Telephony Access State Machine begin at the Telephony I/F Not Configured state 540 where the CTA is not provisioned for access and has not yet tried to register with the telephony network. The CTA remains in this state if a PKINIT exchange with a signaling controller fails.

The CTA can advance to an Unprovisioned Telephony Access state 550 if the CTA performs a PKINIT exchange with the signaling controller using a manufacturer-signed certificate. In this state, the CTA is granted the right to make a phone call to the CSR and maybe to call 911. If the Kerberos AP Request sent by the CTA to the signaling controller fails or is rejected, the CTA remains in this state. The CTA can also return back to the Telephony I/F Not Configured state 540 if the Kerberos ticket received from the PKINIT exchange expires.

The CTA can advance to an Unprovisioned Telephony Security Context state 560 following a successful Kerberos AP Request/Reply exchange with the signaling controller. To arrive at the state, the unprovisioned CTA went off-hook, at which time it used a Kerberos ticket from the PKINIT exchange to establish a set of keys for use with IPsec ESP. IPsec ESP sessions will be used for signaling messages with the signaling controller, the CSR's CTA or Telephony Gateway and possibly with some additional Telephony Network Servers. If the CTA call to the CSR fails, the CTA remains in this state. Additionally, if the IPsec security association expires, the CTA returns to the Unprovisioned Telephony Access State 550.

The CTA can advance to a Received Network Operator-Issued Certificate state 570. To get to this state, the CTA customer picked up the phone and called the CSR. The customer provided information such as the name, address, and credit card number to the CSR. The CSR entered this information into a database. As a result, both the Telephony Network and the HFC Network were reconfigured to allow access to this customer, and a Network Operator-issued X.509 certificate was sent down to the CTA. In this state, the CTA is fully provisioned for the telephony service, but typically can't gain access until it reboots.

The CTA can advance to the Provisioned Telephony Access 580 by rebooting after receiving a Network Operator-issued certificate. The next attempt by the CTA for a PKINIT exchange with the new certificate should grant it the ability to make telephone calls, based on the subscribed service options.

In the case that the CTA's privileges were revoked or if the customer simply discontinued service, a PKINIT exchange with the Network Operator-issued certificate will fail. That will cause the CTA to go back to the Telephony I/F Not Configured state 540, where the CTA may get provisioned again.

Figure 6:
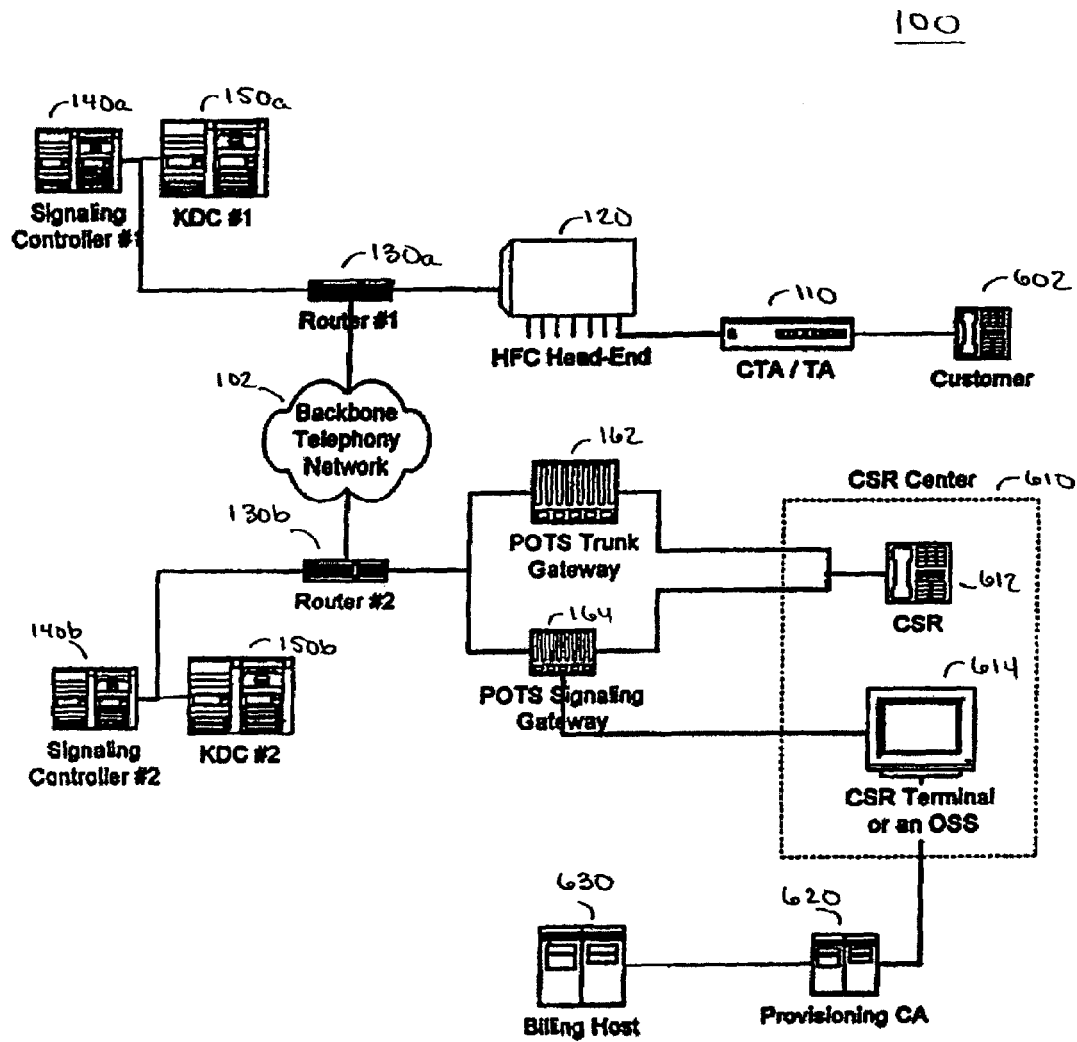
FIG. 6 is a functional block diagram of an embodiment of a portion of a secure IP telephony system participating in CTA provisioning.

FIG. 6 is a functional block diagram of an embodiment of a portion of a secure IP telephony system 100 participating in CTA provisioning. The secure IP telephony system 100 can be the same system as that shown in FIG. 1. However, the functional block diagram of FIG. 6 focuses on the elements that participate in provisioning of a CTA.

The functional block diagram shows the portion of the secure IP telephony system 100 that includes the customer device 602 coupled to a CTA 110. The CTA 110 is coupled to a HFC head-end, which can be a CMTS 120. The CMTS 120 is coupled to a first router 130a that is in turn coupled to a network 102, first signaling controller 140a and first KDC 150a.

A second branch of the network 102 is coupled to a second router 130b that is also coupled to a second signaling controller 140b, second KDC 150b, POTS trunk gateway 162 and POTS signaling gateway 164.

The POTS gateways, 162 and 164 are coupled to a CSR center 610 that includes a CSR device 612, which may be a POTS phone at the CSR center, and a CSR terminal 614. The CSR center 610 is also coupled to a provisioning CA 620 that is coupled to a billing host 630.

In the functional block diagram of FIG. 6, the CTA 110 represents the device that is being provisioned. A customer can talk on the phone or customer device 602 connected to the CTA 110 that is being provisioned. The HFC head-end can include a CMTS 120, DHCP Server, TFTP Server, DNS Server and any other entity residing in the HFC Head-End. All of these have been merged into one line to make the diagram more compact. Details of the HFC Head-End provisioning are defined by DOCSIS.

The routers, such as the first router 130a is configured to route IP packets between the HFC Head-End and the telephony network 102. In some embodiments, the first router 130a can be located inside the HFC Head-End and maybe even merged with the CMTS 120. The second router 130b is configured to route packets between the POTS Gateways, 162 and 164, and the IP Telephony network 102.

The KDCs 150a and 150b are configured to issue Kerberos tickets that are used to generate sub-keys for IPsec ESP and other secure connections: The first KDC 150a is configured to interface with the CTA 110 and first signaling controller 140a. The second KDC 150b close to the CSR 610 is configured to communicate with the POTS Gateways 162 and 164.

The POTS Signaling and Trunk Gateways, 164 and 162 interface between the POTS network and the IP Telephony network 102. It is assumed on this diagram that the CSR center 610 uses a plain telephone 612. However, in other embodiments, the CSR center 610 is connected to a CTA (not shown) within the IP telephony network 102.

The CSR center 610 includes a terminal 614 that is configured to extract the information about the calling CTA 110 from the POTS Gateway 162 and 164 and is able to enter information into the Provisioning CA 620. Instead of a plain terminal it may be an operations support system (OSS).

The Provisioning CA 620 can be a Network Operator's Certification Authority that issues certificates to provisioned CTA or TA units. The Provisioning CA 620 can contain customer information such as a telephone number. It does other provisioning functions as well, such as deliver customer/CTA information to other servers such as the Billing Host 630 and the signaling controller. There is typically only a single logical Provisioning CA 620 in a IP Telephony network, although the Provisioning CA 620 may be distributed across one or more devices in one or more network locations.

The Billing Host 630 is a host that is responsible for billing customers of the IP Telephony network. There is typically only a single logical Billing Host 630 in an IP Telephony network but it may distributed across multiple devices and multiple locations.

Figure 7:
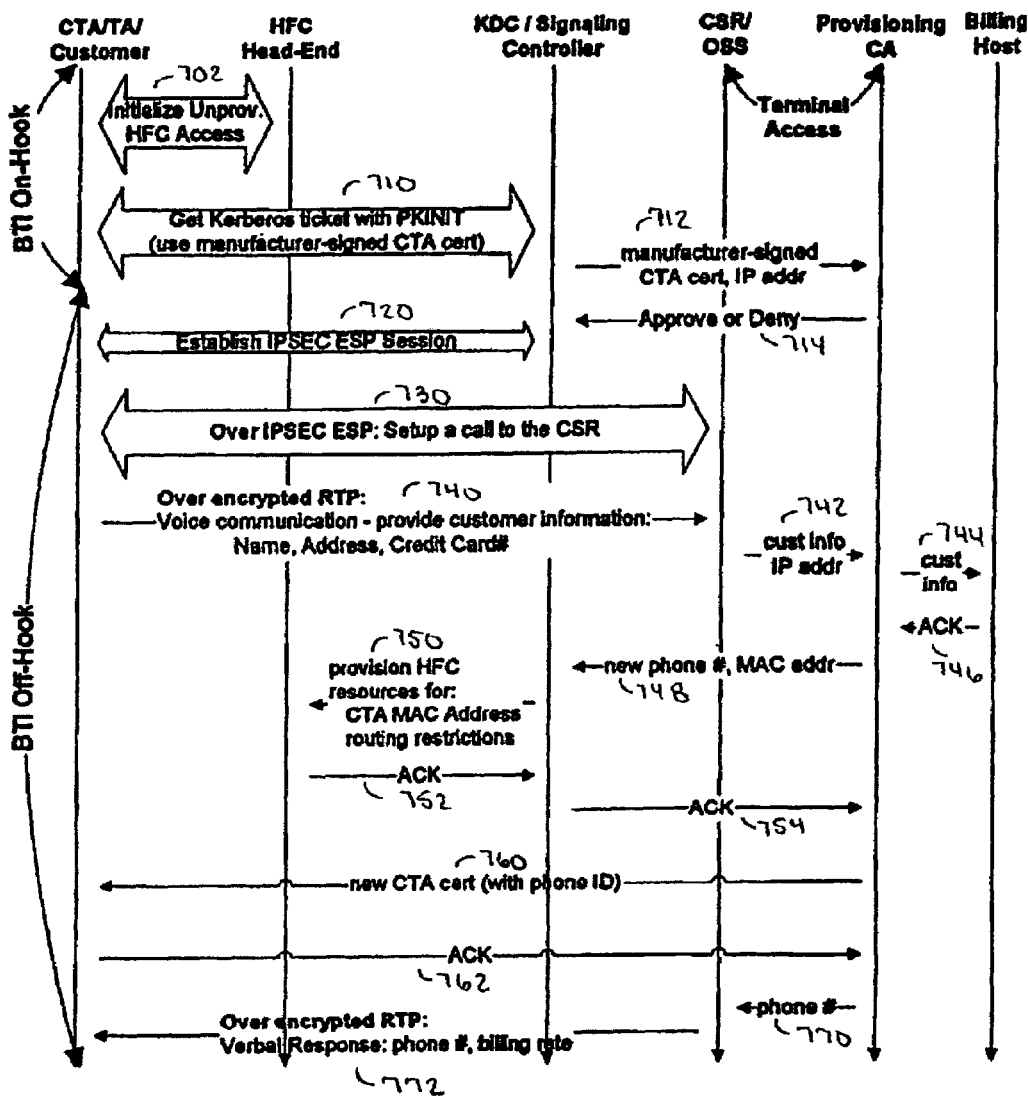
FIG. 7 is a flow diagram of an embodiment of CTA provisioning.

FIG. 7 is a flow diagram of an embodiment of CTA provisioning performed, for example, by the elements shown in the portion of the secure IP telephony system 100 of FIG. 6. In the embodiment shown in the flow diagram, a brand new CTA out of the factory is being installed at the customer site. There are several different customer registration options. Registration can be performed by an installer that has an existing work order number, registrations can be performed by the customer himself or herself, registration can be performed by the customer or installer talking directly to a customer representative, or registration can be automated over a voice menu.

Furthermore, a CTA can either be integrated together with the Cable Modem, or it can be a separate device that plugs into the Cable Modem via an Ethernet or USB port. This device is referred to as a Telephony Adapter (TA). All of these options are covered by the flow diagram. The flow diagram omits some of the ACK messages for the sake of clarity.

The CTA provisioning begins when the CTA communicates with the HFC head-end and initializes unprovisioned HFC Access 702. This can be a standard DOCSIS registration process for a Cable Modem, in the case of an integrated CTA, or for an attached Customer Premises Equipment (CPE), in the case of a TA. Because the CTA or TA is not yet provisioned, it is assigned an unprovisioned IP address. The use of the unprovisioned IP address restricts the CTA to exchanging messages with a limited number of hosts or IP addresses, which may include the local signaling controller, the CSR, and the Provisioning CA. As part of the initialization process, the CTA downloads an appropriate version of the software that it needs for IP Telephony.

After initializing unprovisioned HFC access, the CTA communicates with the KDC and signaling controller to get Kerberos Ticket Using PKINIT 710. This process is similar to the PKINIT exchange described earlier. However, there are some differences. The certificate used by the CTA is the one that was installed in the factory, signed by the manufacturer. This certificate contains the CTA MAC address, which should be verified by the KDC.

The KDC can be configured to check with the HFC Head-End accessing, for example, a DHCP Server to determine whether the IP address is valid and if the MAC address in the certificate corresponds to that IP address and has not been marked as "bad" at the HFC Head-End. The HFC Head-End can be configured to employ some sort of a physical layer cloning detection scheme and that can identify whether the current unit is a clone.

The CTA manufacturer certificate is also sent in the PKINIT request. This certificate is used by the signaling controller to verify the signature on the CTA certificate. The obtained Kerberos ticket has additional information, which restricts the CTA to telephone calls to only a single destination, for example, the CSR. If desired, the unprovisioned CTA may be allowed to also call an emergency number, such as the 911 number. This restriction may be placed inside the authorization-data field inside the Kerberos ticket.

The signaling controller forwards the manufacturer-signed CTA Certificate to a provisioning CA 712. The manufacturer-signed CTA certificate, obtained by the signaling controller during the PKINIT exchange is passed on along with the CTA's unprovisioned IP address to the Provisioning CA. The provisioning CA saves this certificate and will later, when it receives customer information, uses it to generate another CTA certificate, specific to this telephone network.

The IP address of the signaling controller, which may be the same as the IP' address of the KDC, is also saved by the Provisioning CA, so that it can later inform the signaling controller of the telephone number of the newly provisioned CTA. The provisioning CA sends an approve or deny message back to the originating signaling controller 714.

The CTA can then establish IPsec ESP Session with the signaling controller 720. When the unprovisioned CTA or TA goes off-hook, an IPsec ESP session with the signaling controller is initialized. A Kerberos ticket is used in the AP Request/AP Reply messages to mutually authenticate the CTA and signaling controller and to obtain a sub-key. The sub-key is used to derive the necessary keys for IPsec ESP.

The Kerberos ticket contains restrictions limiting the CTA to calls to the CSR and possibly the 911 number. The signaling controller is configured to enforce these restrictions on the subsequent calls from this CTA.

After establishing the IPsec ESP session with the signaling controller, the CTA proceeds to Setup a Call to CSR 730. In this step, signaling messages are exchanged, in order to establish a connection with a CSR, which may be a voice or data connection. The messages include CTA-to-SC, CTA to CTA messages and possibly signaling messages exchanged with another Network Server. The sub-key distribution for securing CTA to Network Server and CTA to CTA links are also included in this step. The signaling messages are sent over a secure IPsec ESP layer.

In another embodiment, the CTA software may be configured, so that when it is in an un-provisioned state, to automatically dial the CSR as soon as the phone goes off-hook. In such an embodiment, however, an un-provisioned CTA will not be able to dial 911. If emergency access is a requirement, then the CTA should be configured for the embodiment in which the CSR telephone number is entered manually.

After establishing a call to the CSR, the CTA can exchange Customer Information 740 over the encrypted RTP link established with the CSR. If the customer is performing his or her own installation, he or she provides customer information over the phone, including, for example, name, address, credit card number, and other parameters. The customer can also specify the type of desired service or desired options for service. The customer may also specify the desired telephone number if such an option is available in the particular IP Telephony network.

In another embodiment where an installer provisions the CTA in response to a work order number, all of the customer information and the CTA identity should already be available to the Network Operator from earlier communications scheduling the installer. At this time, the installer simply provides the work order number and a customer service representative is able to find all of the corresponding customer information.

In yet another embodiment, it is not necessary for a human customer service representative to answers the phone on the Network Operator side. Instead, the customer or installer may be directed to a voice menu, where all of the required information is entered through the telephone keypad. This embodiment may be especially convenient when an installer is calling with a work order number.

The customer information entered by the CSR is forwarded to the Provisioning CA 742, which assigns the customer a telephone number, appropriate for where the customer is located. The CSR determines the calling CTA's unprovisioned IP address, and forwards the address to the Provisioning CA along with the customer information. This information will enable the Provisioning CA to send messages to configure the calling CTA. The CTA IP address can also be used by the Provisioning CA to find the manufacturer-signed certificate for the calling CTA.

The CSR terminal in this case has the ability to display the IP address of the calling CTA. Alternatively, if the CSR is using a regular phone, connected to a PSTN Gateway, the CSR obtains the CTA IP address from the gateway in some other manner. For example, an OSS connected to the CSR's CTA or a PSTN Gateway automatically detects the IP address of the calling CTA and delivers it to the Provisioning CA.

The Provisioning CA updates the Billing Host 744 with the customer information and the assigned telephone number. The Billing Host sends an ACK 746 in response to successful receipt of the customer information.

The Provisioning CA then assigns New Telephone Number. The new telephone number and the corresponding MAC address found in the original manufacturer-signed CTA certificate are sent from the Provisioning CA to the signaling controller 748. The signaling controller can then be configured to accept a CTA certificate that contains that telephone number. The MAC address is used by the signaling controller to provision the necessary HFC resources for the CTA.

The signaling controller provisions the CTA for the required HFC resources. It sends to the HFC Head-End the CTA MAC address and routing information 750. The routing information can include valid source and destination IP addresses for this CTA. Other information may also be included for the HFC Head-End. After this step, the CTA is allowed to exchange messages with any provisioned node in the IP telephony network. The HFC Head-End sends an ACK message 752 to the signaling controller in response to successful receipt of the information.

The ACK is forwarded by the signaling controller to the Provisioning CA 754. The Provisioning CA then can complete provisioning by sending a new CTA certificate, signed by the new Network Operator, and containing identifying information for this telephone network, such as the phone ID. The phone ID may be a one-way function of the phone number, such as an SHA-1 hash, but is typically not the phone number itself which may be unlisted. The provisioning is completed in this step, after the CTA receives its new certificate and returns an ACK message 762. The Network Operator certificate needed by the CTA to verify the new CTA certificate should already be present in the CTA after the software code download. The CTA is now ready to place and receive telephone calls anywhere within this telephone network.

The CSR receives the actual telephone number from the Provisioning CA 770 and relays it over the phone to the CTA customer 772, along with information regarding how the customer will be billed. At this time, the CTA is fully provisioned.

If a new IP Telephony customer is registering with a particular Network Operator and the CTA is not brand-new out of the factory, the CTA is provisioned in a manner similar to that of a new device. The CTA may need to be re-provisioned if the CTA was previously used by the same customer with a different Network Operator, by a different customer with the same Network Operator, or by a different customer with a different Network Operator.

Regardless of how the CTA was used previously, the previous identity and the previous certificate issued by a Network Operator is still stored in the CTA. However, that certificate is no longer valid. The CTA should have been de-provisioned as described in relation to FIG. 8.

In this case, the CTA attempts to perform a PKINIT exchange using an old certificate that is no longer valid. The CTA will get an error back from the signaling controller. The CTA software will then automatically remove the invalid certificate and transition into an un-provisioned state. At this time, the CTA provisioning will proceed according signal flow for provisioning of a new CTA.

Just as devices are provisioned before being allowed access to the IP telephony network, devices can be de-provisioned to prevent unauthorized access to the network. The customer may discontinue telephone service for the CTA, or the customer may change an IP Telephony provider, or moving to a new location not supported by the current IP Telephony provider.

Figure 8:
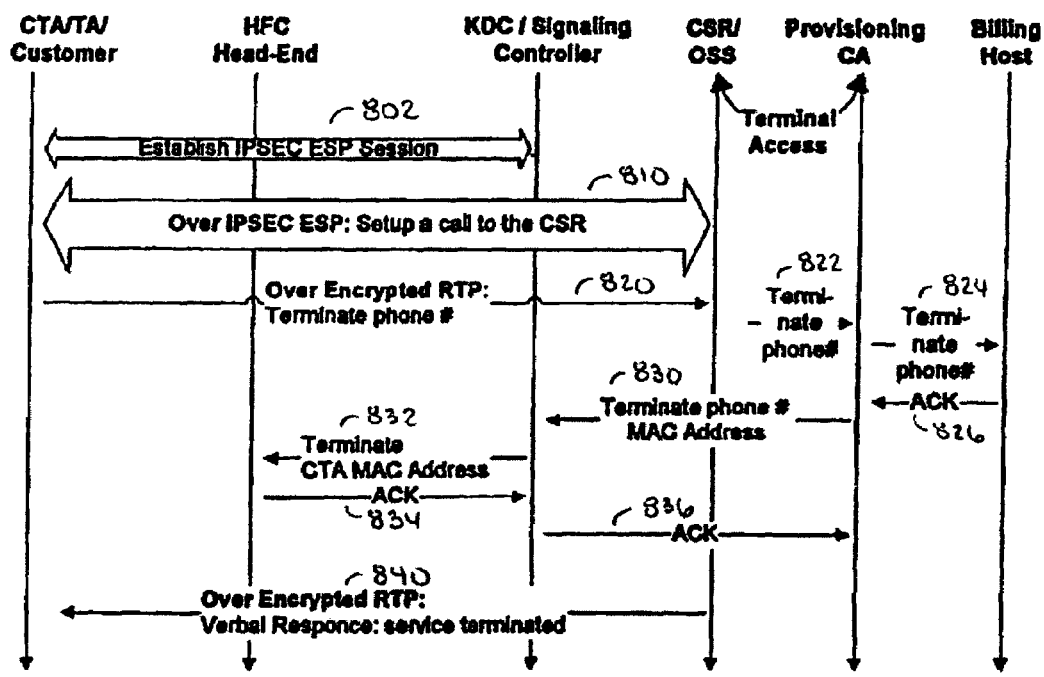
FIG. 8 is a flow diagram of an embodiment of CTA de-provisioning.

FIG. 8 is a flow diagram of an embodiment of CTA de-provisioning. The customer, via the CTA, can request termination of service. The CTA can establish an IPsec ESP session with the signaling controller 802, for example, by going off hook. The CTA can then set up a call with the CSR 810. The CTA can initiate a request over the encrypted RTP to terminate the phone number 820. The CSR relays the termination message and associated information to the Provisioning CA 822. The Provisioning CA in turn sends a termination request to the Billing Host 824 and a termination message to the signaling controller 830. The Billing Host then replies with an ACK message 826.

The signaling controller forwards the termination message to the HFC Head-End 832. The HFC Head-End returns an ACK to the signaling controller 834 and the signaling controller sends an ACK to the Provisioning CA 836. The CSR can then send a message or a voice confirmation to the CTA informing it that the service is terminated 840.

Next time that the CTA tries to use its Kerberos ticket before making a phone call, the ticket will be rejected because that phone number is no longer in the signaling controller's database. The rejection message will cause the CTA to try and obtain another Kerberos ticket. The CTA tries to perform a PKINIT exchange with its Network-Operator-signed certificate but will fail again. This will cause the CTA to remove the invalid certificate and transition into an un-provisioned state.

Figure 9:
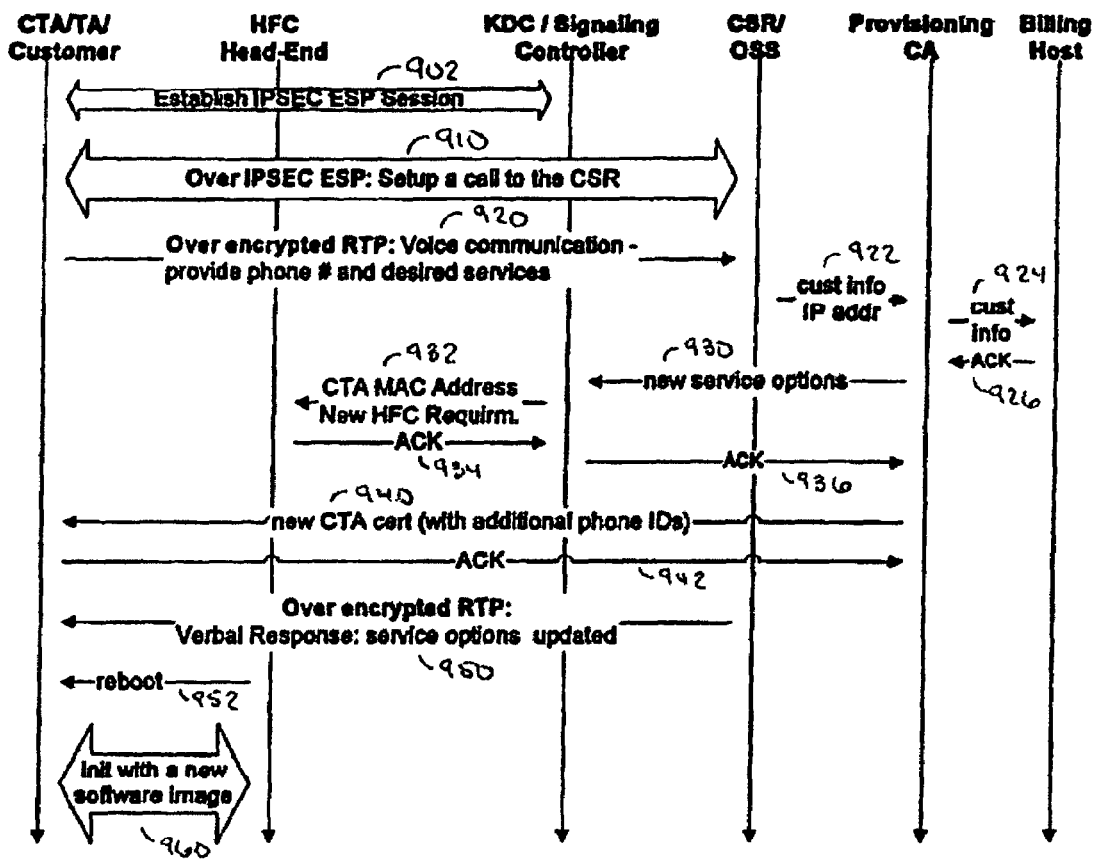
FIG. 9 is a flow diagram of an embodiment of CTA change of service.

FIG. 9 is a flow diagram of an embodiment of CTA change of service. In this scenario, the CTA is re-provisioned to change the service options. For example, Caller ID service may be added, a different billing option is selected, or some other change in service may be requested. In most cases, the change of service does not require the Provisioning CA to issue a new CTA certificate. An exception is the situation where a CTA is provisioned for an additional phone number on another CTA port. In that case, the Provisioning CA issues a new CTA certificate containing an updated list of phone IDs for that CTA.

In this scenario, the customer calls up the CSR to request the changes in service. The CTA establishes an IPsec ESP session with the signaling controller 902, for example, by going off hook. The CTA can then set up a call with the CSR 910. The CTA can initiate a request over the encrypted RTP for the change in service 920. The CSR relays the change request message and associated information to the Provisioning CA 922. The Provisioning CA in turn sends the change request to the Billing Host 924. The Billing Host then replies with an ACK message 926. The Provisioning CA also sends the new service options to the signaling controller 930. The signaling controller sends the CTA MAC and any new HFC requirements to the HFC Head-End 932. The HFC Head-End returns an ACK message 934.

If necessary, Provisioning CA issues a new certificate to the CTA 940. The CTA may also be directed by the HFC Head-End to download a different version of the CTA software. The CSR can contact the CTA over the encrypted RTP and confirm service options updated 950. The HFC Head-End can initiate a reboot of the CTA 952. Once the CTA reboots, the CTA can initialize with a new software image 960 providing the desired services.

The CTA already possesses a Network Operator certificate, so that it is able to perform a signature verification check along with the time validity check on the new certificate. The time validity check will not only make sure that the issued certificate had not expired, it ensures that the new certificate's starting time is greater than the starting time of the old certificate thereby ensuring the new certificate is not a replay.

Figure 10:
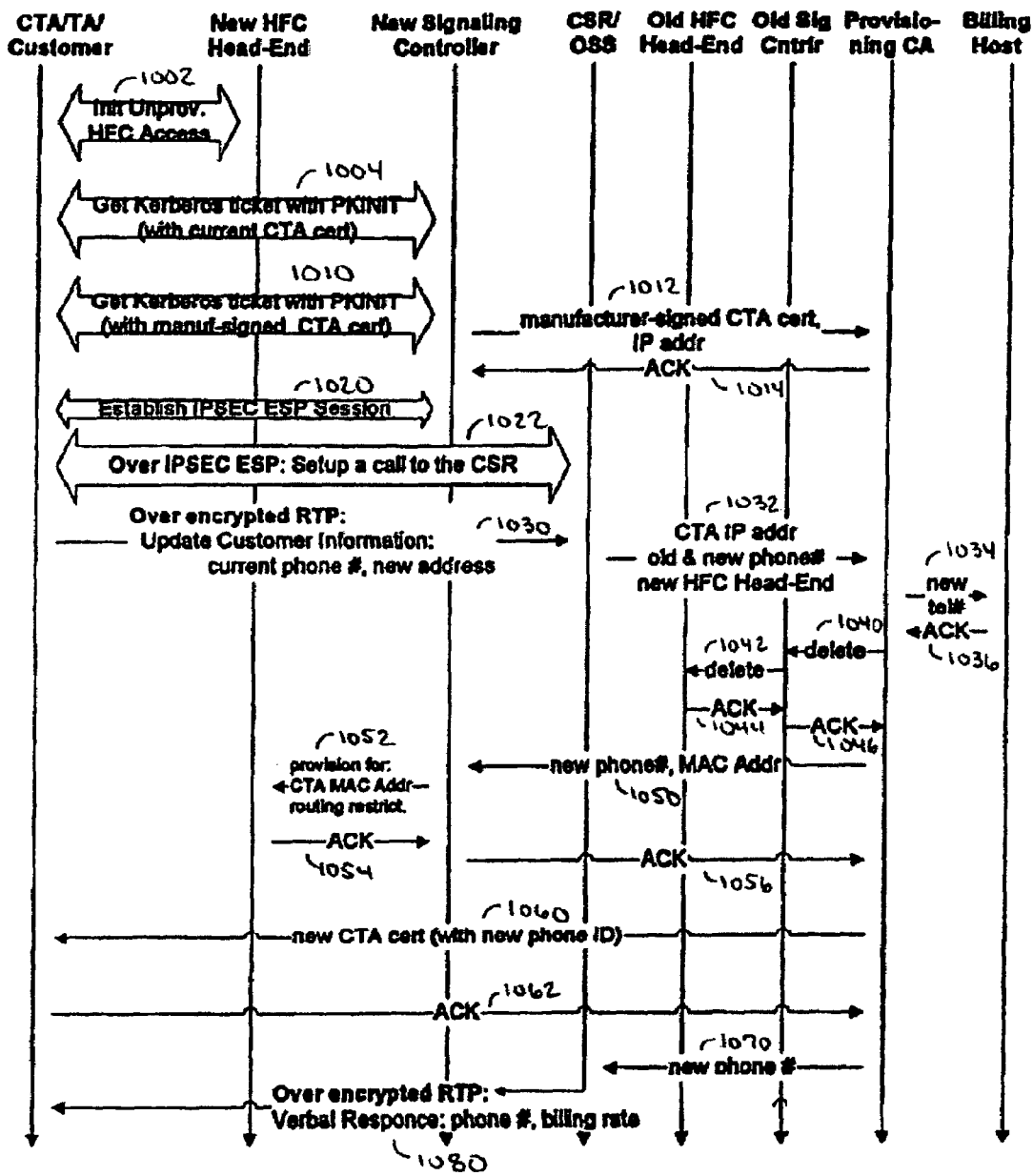
FIG. 10 is a flow diagram of an embodiment of a CTA HFC segment move.

FIG. 10 is a flow diagram of an embodiment of a CTA HFC segment move. The CTA may move to a new location corresponding to a new HFC segment. The same IP Telephony company may serve the new area, but the CTA may need to be assigned a new telephone number and re-provisioned for the new HFC segment.

Following the segment move, the CTA connects to a different HFC Head-End that has not been previously provisioned for this CTA. Thus, the CTA is initialized with an un-provisioned IP address by the new HFC, Head-End 1002.

The CTA proceeds with a PKINIT exchange with the signaling controller, using its current certificate, issued by the Network Operator 1004. However, the new signaling controller does not recognize the certificate and the PKINIT exchange fails.

The CTA now falls back to a PKINIT exchange with the manufacturer-signed certificate 1010. The manufacturer-signed CTA certificate, obtained by the signaling controller during the PKINIT exchange is passed on to the Provisioning CA by the signaling controller 1012. The Provisioning CA doesn't actually need this certificate, because it already contains a CTA certificate for the old segment. However, this step is performed for consistency. The signaling controller performs this step for every un-provisioned CTA. Along with the CTA certificate, the signaling controller also sends the unprovisioned IP address for that CTA. The Provisioning CA sends an ACK 1014 in response.

The IP address of the signaling controller, which may be the same as the IP address of the KDC, is saved so that it can later be informed by the Network CA about the new Customer ID of the newly provisioned CTA.

The CTA establishes an IPsec ESP session with the signaling controller when the unprovisioned CTA or TA 1020 receives the Kerberos ticket. A Kerberos ticket is used in the AP Request/AP Reply messages to mutually authenticate the CTA and signaling controller and to obtain a sub-key. This sub-key is used to derive the necessary keys for IPsec ESP. The Kerberos ticket contains restrictions, limiting the CTA to calls to the CSR and possibly the 911 number. The signaling controller enforces these restrictions on the subsequent calls from this CTA.

The CTA then sets up a call with the CSR 1022. Signaling messages are exchanged in order to establish a voice connection with a CSR. This includes CTA to SC, CTA to CTA messages and possibly signaling messages exchanged with another Network Server. The sub-key distribution for securing CTA to Network Server and CTA to CTA links is also included in this step. The signaling messages are sent over a secure IPsec ESP layer.

The CTA then sends over the secure RTP link the updated customer information 1030. The CSR will send the old telephone number and the new customer information to the Provisioning CA 1032. The Provisioning CA will generate a new telephone number, based on the new customer location.

The Provisioning CA updates the Billing Host with the new customer information and with both the old and the new customer ID 1034. The Billing Host sends an ACK in response to the information 1036.

The Provisioning CA notifies the Old signaling controller that the old customer ID (phone number) is no longer authorized and should be removed from its database 1040. The corresponding MAC address (found in the original manufacturer-signed CTA certificate) is also sent. This MAC address is used by the signaling controller to remove the HFC resources for this CTA in the old HFC Head-End.

The old HFC Head-End is notified by the signaling controller that the CTA MAC address is no longer provisioned for that particular HFC segment 1042. The old HFC Head-End sends an ACK in response 1044. Similarly, the old signaling controller sends an ACK to the Provisioning CA 1046.

The Provisioning CA sends the new phone number and the corresponding MAC to the signaling controller 1050. This will allow the signaling controller to accept a CTA certificate that contains the corresponding phone ID. The MAC address is used by the signaling controller to provision the necessary HFC resources for the CTA.

The signaling controller provisions the CTA for the required HFC resources. The signaling controller sends to the HFC Head-End the CTA MAC address and routing information 1052, including a valid source and destination IP addresses for this CTA. Other information may also be required by the HFC Head-End. The HFC Head-End responds with an ACK message 1054. After this step, the CTA is allowed to exchange messages with any node in the IP telephony network.

The Provisioning CA sends a new certificate signed by the new Network Operator and containing the new phone ID to the CTA 1060. The CTA responds with an ACK message 1062. Now, the CTA is ready to place and receive telephone calls anywhere within this telephone network. Finally, the CSR gets the new telephone number from the Provisioning CA 1070 and relays it over the phone to the CTA customer 1080.

In the situation where a CTA requires repair, the CTA is shipped to a repair facility. After the CTA is repaired, it may be tested within the IP telephony system. The CTA can be re-provisioned for a special account associated with that repair facility to ensure that the customer does not get billed for the telephone services that are being tested in the repair facility.

A test engineer blows away the customer certificate in the CTA, possibly through the front panel controls in the CTA. The customer is still provisioned and the certificate can always be loaded back from the network, as described earlier. The CTA enters the un-provisioned state (even though the customer is still provisioned) and will follow the provisioning steps detailed earlier. The CTA is now provisioned for the repair facility. Typically the new certificate is configured to have a short validity period ranging over a few days or even a few hours.

If the original CTA was broken and shipped to a repair facility and the repair facility sends a temporary loaner CTA to the customer, the replacement CTA goes through the same provisioning steps as a previously unprovisioned CTA.

Once a CTA is repaired and tested in the repair facility, it is returned to the customer. However, during the testing phase, the CTA certificate may have been replaced with the one for the repair facility. After the testing was completed, the test certificate is either deleted from the CTA, or the CTA could undergo the full de provisioning process.

Figure 11:
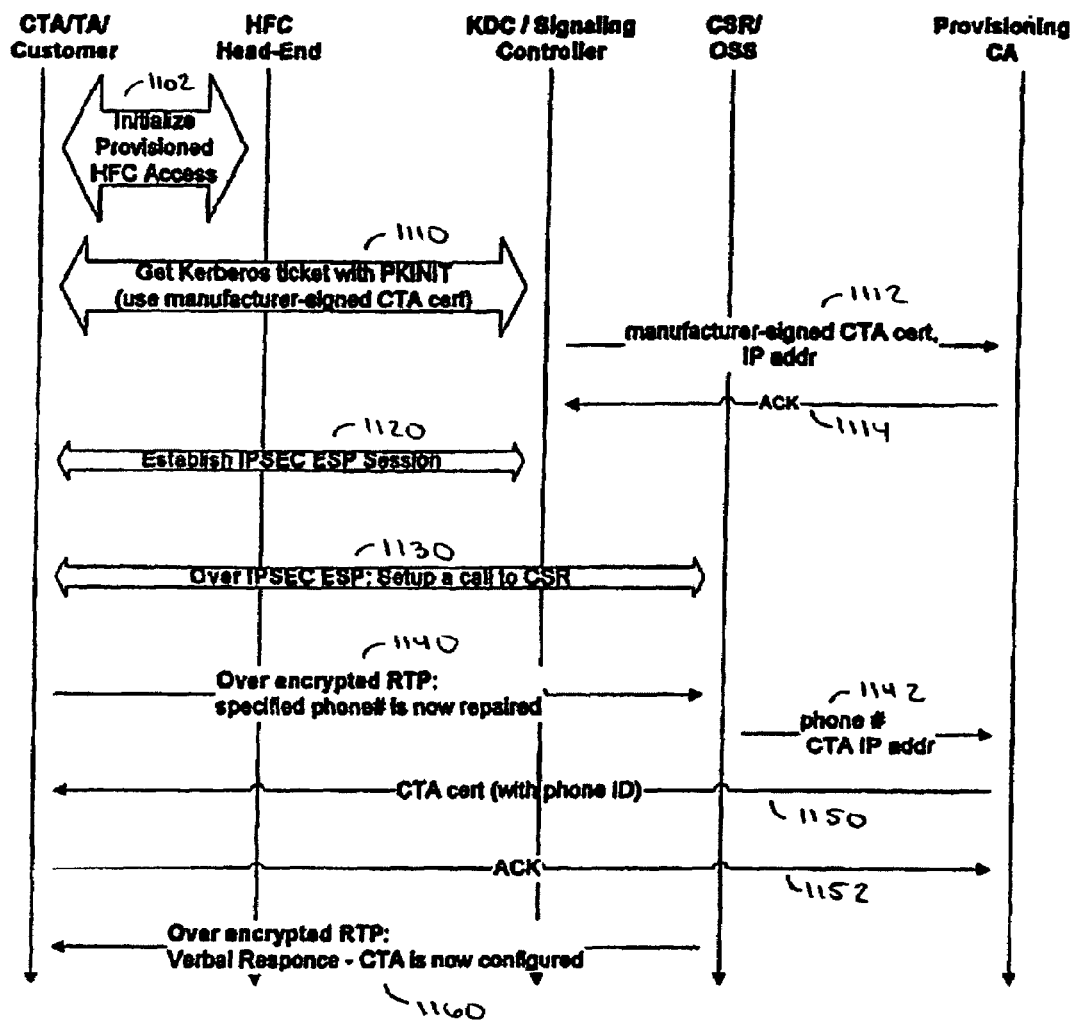
FIG. 11 is a flow diagram of an embodiment of post repair CTA reprovisioning.

The CTA can be reconfigured with the same customer's certificate before it is shipped back to the customer. FIG. 11 is a flow diagram of an embodiment of post repair CTA re-provisioning.

In the diagram, the CTA gets unprovisioned access to the HFC segment connected to the repair facility 1102. The CTA performs an unprovisioned PKINIT exchange with the local signaling controller 1110, which relays the manufacturer-signed CTA certificate to the Network Operator Provisioning CA 1112. The Provisioning CA returns an ACK 1114. In this case, the Provisioning CA has no use for this certificate, but accepts the message anyway for consistency. The signaling controller always sends this certificate for an unprovisioned CTA.

A technician at the repair facility then calls up the CSR. The CTA establishes an IPsec ESP session with the signaling controller 1120 and a call is set up to the CSR 1130. The technician can explain that the CTA has now been repaired and should be configured back with the owner's certificate 1140. The CSR enters this request into the Provisioning CA 1142, which sends the CTA the appropriate certificate 1150. As with other provisioning scenarios, the CSR has to determine the unprovisioned IP address of the calling CTA and enter it into the Provisioning CA. This allows the Provisioning CA to find the CTA and send it the certificate. The CTA returns an ACK message 1152 and the CSR can inform the technician calling from the CTA that the CTA is configured 1160. At this point, the CTA is fully provisioned for its owner and will work in the provisioned state, once moved back to the HFC segment, where it is already provisioned.

A CTA, in addition to accessing telephony services, may also function as a general-purpose cable modem capable of accessing various network services connected to the HFC Head-End. The router at the HFC Head-End may contain an IP packet filter. Based on an IP address, the router can determine if an upstream packet should be allowed to continue on to a particular destination. Similarly, a downstream packet may be checked by the router, to see if it can be delivered to its destination IP address.

With no cryptographic protection, a CTA (or a CPE plugged into a CTA) can fake its IP address and thus gain unauthorized access to a particular part of the network. This threat exists even for unprovisioned CTA units. In the provisioning scenarios described earlier, the unprovisioned CTA is given some limited access to the HFC network so that the customer can call the CSR and register with the telephony network. A perpetrator might change the IP address of the unprovisioned CTA so that it appears to be provisioned and is able to access some network services.

This threat is not directed at the telephony services and may or may not be of concern to the HFC Head-End Operator. Thus the solutions to this problem that are described below are optional for an IP telephony system.

The Baseline Privacy Interface (BPI+) can be used to address this problem. BPI+ not only provides privacy, but is also able to implicitly authenticate the MAC address of each packet. This approach would require the HFC Head-End to keep a database that associates each cable modem MAC address with a list of IP addresses assigned to the cable modem and to its connected CPE devices. Thus, with the use of a database, the HFC Head-End would prevent a cable modem or a CPE from using fake IP addresses.

Another, more direct, approach is also possible. Each CTA, TA or any other CPE connected to a cable modem can be required to run an IPsec AH tunnel to the router. This means that the contents of each IP packet, along with the source and destination IP addresses would be authenticated. As long as each device has its own unique security association with the router, it would not be possible to use a fake IP address.

Figure 12:
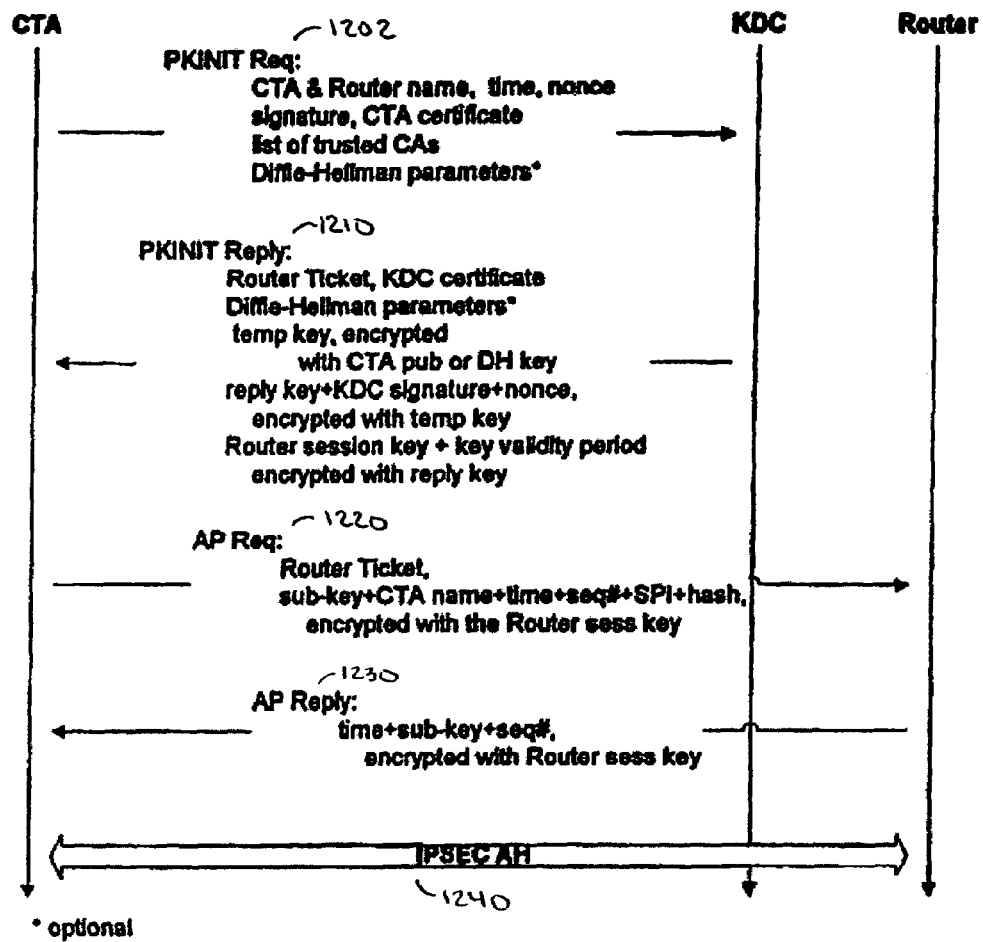
FIG. 12 is a flow diagram of an embodiment of key distribution in an IP address authentication system.

FIG. 12 is a flow diagram of an embodiment of key distribution in an IP address authentication system. Because this security mechanism is not specific to an IP Telephony network, it is desirable that the key management for the IPsec AH tunnel is not dependent on the signaling controller, as is the case with the sub-keys that are distributed by the signaling controller for the CTA to CTA messages.

The PKINIT protocol is used by a device to obtain a Kerberos ticket for the router from the KDC. The device initiates a PKINIT request to the KDC 1202 and receives a PKINIT reply 1210 that includes the Kerberos ticket for the router. The device then presents this ticket to the router 1220 and they establish a sub-key 1230, used to derive all of the necessary IPsec AH parameters (SPI, 2 HMAC keys). The lifetime of the IPsec AH keys is completely unrelated to the telephone calls. In fact, the telephony interface may not be present in the device.

Figure 13:
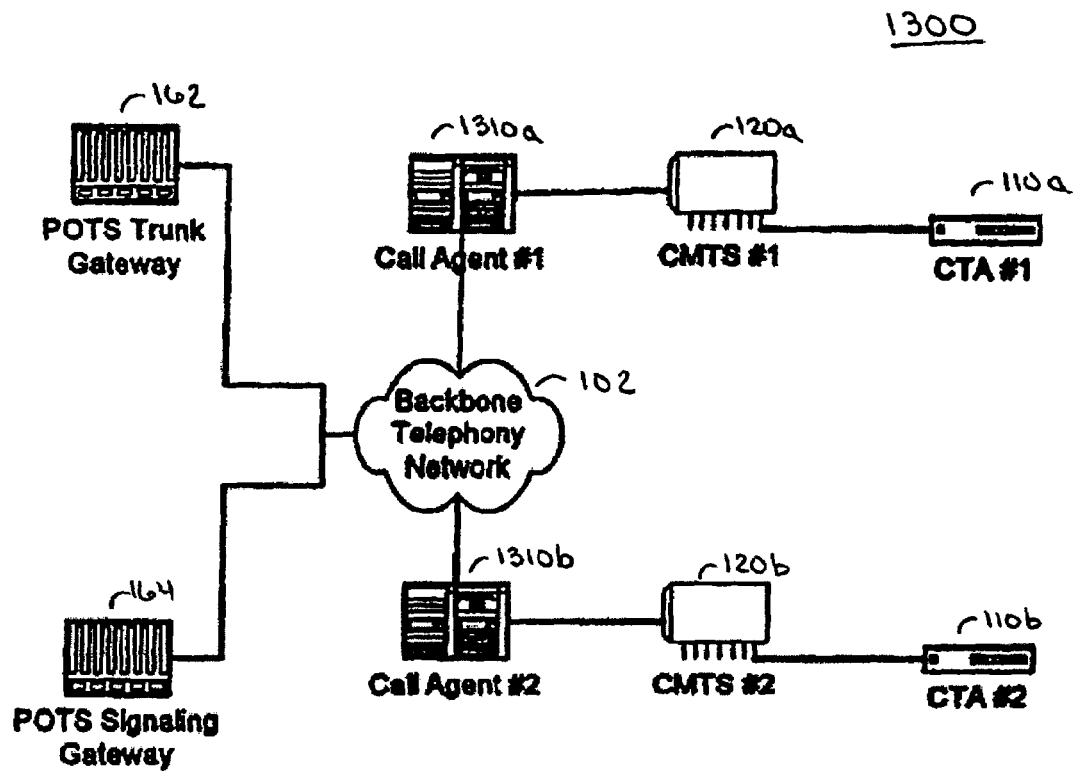
FIG. 13 is a functional block diagram of an embodiment of a Secure Gateway Control Protocol system.

The functional block diagrams of the secure IP telephony systems shown in FIGS. 1 and 6 do not represent the only possible IP telephony configurations. FIG. 13 is a functional block diagram of an embodiment of a Secure Gateway Control Protocol system 1300. In the system 1300 of FIG. 13, SGCP is selected for the signaling protocol and architecture. The security architecture disclosed above still applies, with some simplifications.

The SGCP IP telephony system 1300 includes a first CTA 110a coupled to a first CMTS 120a. The first CMTS 120a is coupled to a first call agent 1310a. The call agent is coupled to the IP telephony network 102. Similarly, a second CTA 110b is coupled to a second CMTS 120b. The second CMTS is coupled to a second call agent 1310b that is coupled to the IP telephony network 102. The IP telephony network 102 can also be coupled to a POTS trunk gateway 162 and a POTS signaling gateway 164.

In the SGCP system 1300, each CTA 110a-110b exchanges call signaling messages with the associated call agent 1310a or 1310b rather than with a signaling controller. To ensure system security, these messages should be authenticated and secured against both replay and sequencing attacks.

The security architecture will not change much for the SGCP signaling. The signaling controller is replaced with the call agent 1310a or 1310b, the SGCP equivalent. The SGCP-based architecture does not allow a CTA, for example 110a, to exchange signaling messages with multiple network elements. Therefore, some simplifications to the previously discussed security architecture can be made. In general, the previously disclosed secure architecture applies with the signaling controllers replaced with the call agents of the SGCP architecture.

The call agent, for example 1310*a*, does not generate and distribute a sub-key for the CTA to Network Server signaling messages. In the SGCP-based architecture, the CTA 110*a* does not talk to any network servers besides the call agent 1310*a*. Additionally, the CTA to CTA sub-key is used to derive only the keys used to secure RTP media packets. There are no CTA to CTA signaling messages to secure.

A secure IP telephony system, apparatus, and methods are disclosed. The secure IP telephony system can operate using any one of several different IP telephony signaling architectures. The system ensures security using a variety of encryption techniques associated with particular links of IP telephony signaling and bearer traffic communications.

The security architecture includes Kerberos key management with the PKINIT extension for initial authentication with public keys. The interface to the Kerberos protocol is the standard GSS-API. Kerberos protocol and makes use of tickets, which are encrypted cookies that do not require the servers to keep state. IPsec in the ESP mode is used to secure signaling protocol messages. Both encryption and authentication is enabled for each IP packet.

The system includes separate Kerberos KDC located near a signaling controller. For convenience, the KDC can be co-located on the same machine with the signaling controller.

All signaling messages can be authenticated and encrypted. The security of signaling messages involving the CTA includes CTA to signaling controller communications, signaling controller to CTA communications, CTA to other Network Server communications, other Network Servers to CTA communications, and CTA to CTA communications. Other signaling messages can also be secured.

PKINIT authentication between the CTA and the KDC occurs at infrequent intervals, at which time a CTA obtains a symmetric session key along with a Kerberos Ticket for the signaling controller. A Kerberos ticket contains a session key, identities of the client (CTA) and the server (signaling controller), and an expiration time. The information is encrypted using a secret key of the server (signaling controller). Access can be limited to the designated server (for example a signaling controller). At least the designated server is able to decrypt the ticket and use that information in the Kerberos ticket.

The same session key that is inside the ticket is also delivered by the KDC to the client (CTA), sealed with the client's public key or with a secret derived from a Diffie-Hellman exchange. Thus, after the CTA hands this ticket to the signaling controller, they share a symmetric session key. The same signaling controller Ticket and session key can be reused for many phone calls, over a configurable period of time, on the order of days or weeks. The expiration time inside the ticket prevents a CTA from using the ticket after it has expired. At that time, the CTA will need to perform another PKINIT exchange with the KDC in order to gain access to the system.

In order to establish an IPsec ESP session with the signaling controller, the CTA presents it a ticket along with some data encrypted with the session key which authenticates the CTA. In response, the signaling controller returns a randomly generated sub-key, encrypted with the session key. The sub-key is used to derive a set of IPsec keys including for example two HMAC authentication keys and two 3-DES encryption keys. These IPsec keys are valid for only one telephone call.

For each call, the source signaling controller also randomly generates a sub-key for the CTA to CTA signaling and bearer channel communication and distributes it to the two CTAs. This key distribution is outside of Kerberos and is done over already established IPsec ESP sessions between each CTA and its signaling controller. Both CTAs then derive a set of IPsec ESP keys for the CTA to CTA signaling messages and another set of keys for encrypting the RTP bearer channel packets.

Physical security is used to protect both the private keys and the long-term symmetric keys stored in the CTA. The keys can be protected inside a secure microprocessor that complies with the FIPS 140-1 standard at the security level 3 or higher.

The public key cryptosystem used for the PKINIT authentication to the KDC can be RSA. RSA can be used for digital signatures as well as for the delivery of a session key. Optionally, the session key is encrypted with a secret derived from an authenticated Diffie-Hellman exchange.

Signaling controller Tickets may be encrypted using a 3-key 3-DES server key. IPsec ESP mode utilizes 3-key 3-DES encryption keys in the CBC mode. Packets may be authenticated with a SHA-1 HMAC.

Each CTA includes an RSA key pair and a corresponding X.509 certificate. This key pair and certificate are installed at the time of manufacture. The CTA certificate from the manufacturer is used in the PKINIT exchanges during the provisioning phase. After the provisioning, the CTA will be issued another certificate for the same RSA public key by the network operator. The resulting certificate will contain the phone ID as a one-way function of the telephone number and can be used in the PKINIT exchanges within the issuing network operator's domain.

The PKINIT exchange can occur without the Diffie-Hellman option, in which case the same RSA key pair shall be used for both signing and encryption. With the Diffie-Hellman option the RSA key pair is used to authenticate the CTA.

The KDC includes an RSA key pair and a corresponding X.509 certificate. This key pair is used for authentication during the PKINIT exchange. The KDC will verify CTA certificates against a customer database, without a need for CRLs. Both the CTA certificate and a customer record should contain the same phone ID. CRLs are still used for revocation of network (KDC) certificates.

The above description of the disclosed embodiments is provided to enable any person skilled in the art to make or use the disclosure. Various modifications to these embodiments will be readily apparent to those skilled in the art, and the generic principles defined herein may be applied to other embodiments without departing from the scope of the disclosure. Thus, the disclosure is not intended to be limited to the embodiments shown herein but is to be accorded the widest scope consistent with the principles and novel features disclosed herein.

What is claimed is:

1. A secure IP telephony system, the system comprising:
a signaling controller within an IP telephony network and in communication with at least one Cable Telephony Adapter (CTA), and configured to perform call set up and tear down and to generate a symmetric sub-key in response to a request from the at least one CTA, the request including a signaling controller ticket;
wherein the signaling controller ticket comprises a signaling controller session key, an identity of the at least one CTA, and an identity of the signaling controller;
the signaling controller further configured to distribute the symmetric sub-key to the at least one CTA in response to the signaling controller ticket; and
a Key Distribution Center (KDC) within the IP telephony network and coupled to the signaling controller, and configured to generate and distribute the signaling controller ticket and said signaling controller session key to the at least one CTA using public key encryption, wherein said at least one CTA generates an additional symmetric key specific for a given call based on the symmetric sub-key provided by the signaling controller.

2. The system of claim 1, wherein the signaling controller is configured to generate and distribute the symmetric sub-key in response to a Kerberos request from the at least one CTA.

3. The system of claim 1, wherein the signaling controller distributes the sub-key encrypted with the signaling controller session key.

4. The system of claim 1, wherein the signaling controller receives from the at least one CTA the signaling controller ticket, wherein a portion of the signaling controller ticket is encrypted with a signaling controller server key.

5. The system of claim 1, wherein the request comprises a Kerberos Application Request having the signaling controller ticket and encrypted data including a name of the at least one CTA.

6. The system of claim 1, wherein the request includes a timestamp.

7. The system of claim 1, wherein the signaling controller authenticates the at least one CTA using the signaling controller ticket.

8. The system of claim 1, wherein the signaling controller communicates with the CTA in an IPsec ESP session in response to receiving a valid signaling controller ticket.

9. The system of claim 1, wherein the signaling controller ticket comprises a Kerberos ticket.

10. The system of claim 1, wherein the signaling controller ticket further comprises an expiration time.

11. The system of claim 1, wherein the KDC distributes to the at least one CTA the signaling controller ticket and a copy of the session key outside of the signaling controller ticket encrypted with a CTA public key.

12. The system of claim 1, wherein the KDC distributes the signaling controller ticket to the at least one CTA, and also distributes to the at least one CTA a copy of the session key outside of the signaling controller ticket encrypted using a shared secret derived from a Diffie-Hellman exchange.

13. The system of claim 1, wherein said additional symmetric key is valid for a single call.

14. The system of claim 1, wherein the KDC generates and distributes the signaling controller ticket in a Kerberos exchange with the at least one CTA.

15. The system of claim 9, further comprising a Provisioning Certificate Authority (CA) in communication with the IP telephony network configured to receive a manufacturer signed CTA certificate and distribute an operator network-specific certificate to the at least one CTA.

* * * * *

UNITED STATES PATENT AND TRADEMARK OFFICE
CERTIFICATE OF CORRECTION

PATENT NO. : 7,568,223 B2 Page 1 of 1
APPLICATION NO. : 10/893047
DATED : July 28, 2009
INVENTOR(S) : Sprunk et al.

It is certified that error appears in the above-identified patent and that said Letters Patent is hereby corrected as shown below:

Title page, item (73), under "Assignee", in Column 1, Line 1, delete "Instrumental" and insert --Instrument--

Signed and Sealed this

Twenty-ninth Day of June, 2010

David J. Kappos
*Director of the United States Patent and Trademark Office*